(12) United States Patent
Marsh et al.

(10) Patent No.: US 11,801,438 B2
(45) Date of Patent: Oct. 31, 2023

(54) ELECTRONIC GAMING MACHINE AND SYSTEM WITH A WHEEL FEATURE MODE DEPENDENT ON BASE GAME OUTCOMES

(71) Applicant: Aristocrat Technologies, Inc. (ATI), Las Vegas, NV (US)

(72) Inventors: David Marsh, Charlottesville, VA (US); Karl Roelofs, Charlottesville, VA (US); Ryan North, Broken Arrow, OK (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 8 days.

(21) Appl. No.: 17/721,163

(22) Filed: Apr. 14, 2022

(65) Prior Publication Data
US 2022/0395744 A1     Dec. 15, 2022

Related U.S. Application Data

(60) Provisional application No. 63/209,299, filed on Jun. 10, 2021.

(51) Int. Cl.
*A63F 3/06* (2006.01)
*G07F 17/32* (2006.01)
*G06F 7/58* (2006.01)

(52) U.S. Cl.
CPC ............ *A63F 3/0645* (2013.01); *G06F 7/588* (2013.01); *G07F 17/3213* (2013.01); *G07F 17/3258* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 8,956,213 B2 * | 2/2015 | Manz | G07F 17/34 463/19 |
| 2001/0054794 A1 * | 12/2001 | Cole | G07F 17/34 273/138.1 |
| 2006/0025195 A1 | 2/2006 | Pennington | |
| 2006/0189379 A1 * | 8/2006 | Pacey | G07F 17/32 463/20 |
| 2008/0113750 A1 | 5/2008 | Vallejo | |
| 2013/0084937 A1 | 4/2013 | Vann | |

(Continued)

*Primary Examiner* — Jason T Yen
(74) *Attorney, Agent, or Firm* — McAndrews, Held & Malloy, Ltd.

(57) ABSTRACT

Embodiments of the disclosure provide an electronic gaming machine, systems and methods with a wheel feature mode dependent on base game outcomes. Specifically, a gaming machine comprises a user interface, a display device, and a game controller. The wheel feature mode is triggered during a base game based on wheel feature mode trigger conditions. The wheel feature mode animates a graphical user interface to present a spinning feature wheel that provides credit value awards, dependent on base game outcomes (e.g., one or more base game bingo pattern outcomes), through a sequence of player-initiated feature wheel spins. If one or more winning base game outcomes remain in the base game, the wheel feature mode continues with each wheel slice value reset, such that the minimum wheel slice value is equal to or greater than the previous spinning feature wheel credit value award which continues until no winning base game outcomes remain.

20 Claims, 19 Drawing Sheets

(56) References Cited

U.S. PATENT DOCUMENTS

2015/0087378 A1\* 3/2015 Louie ................. G07F 17/34
　　　　　　　　　　　　　　　　　　　　463/17
2019/0026976 A1   1/2019 Casey \* cited by examiner

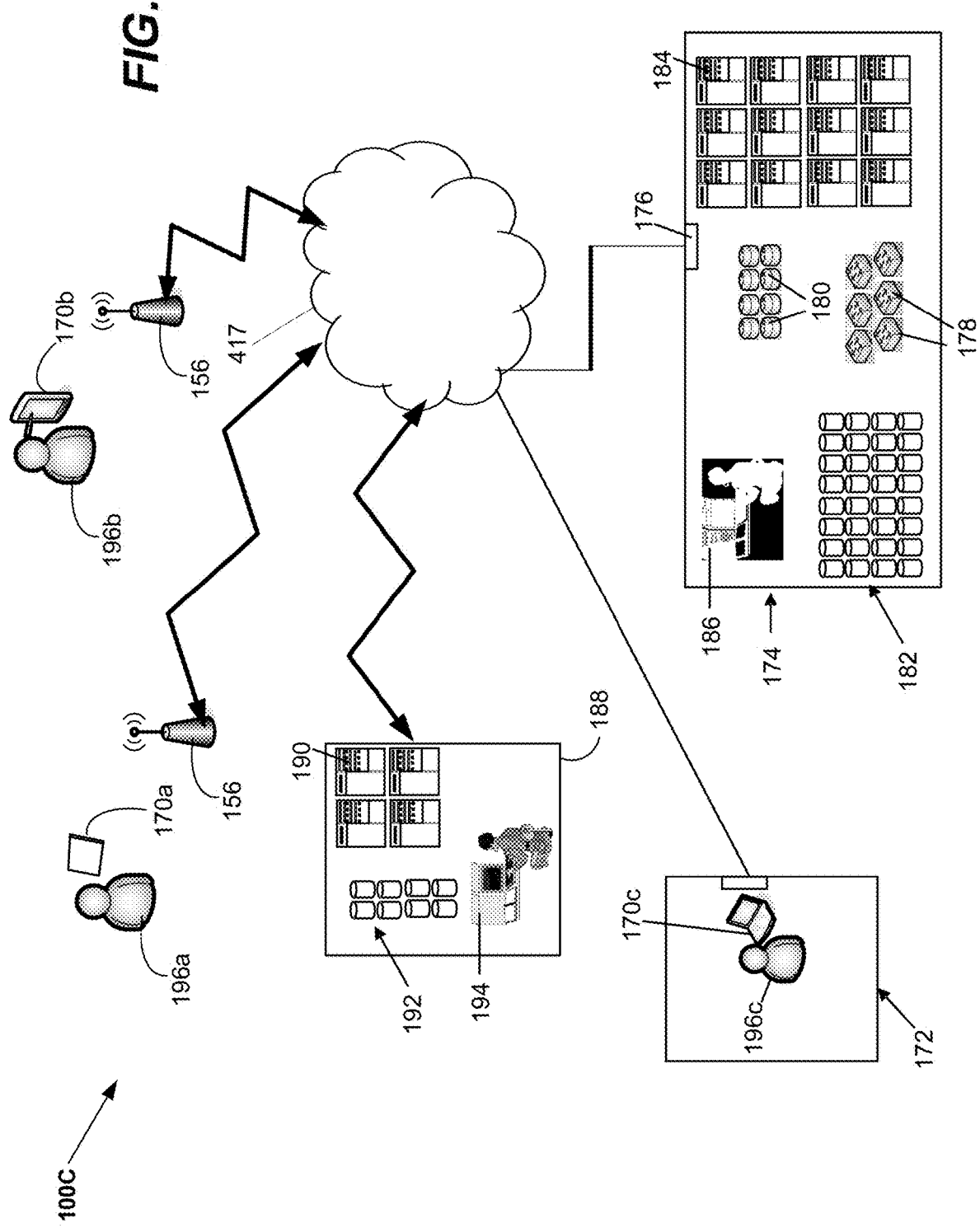

| | | 1st Credit | 2nd Credit | 3rd Credit |
|---|---|---|---|---|
| 🔔 🔔 🔔 PERLINE ONLY | 🔔 🔔 🔔 IN ANY POSITION | 1000 | 1000 | 10,000 |
| 7 7 7 | | 80 | 160 | 240 |
| BAR BAR BAR | BAR BAR BAR | 60 | 120 | 180 |
| BAR BAR BAR | BAR BAR BAR | 40 | 80 | 120 |
| BAR | BAR | 20 | 40 | 60 |
| ANY ANY ANY | BAR BAR BAR | 10 | 20 | 30 |
| | 🔔 / 🔔 IN ANY POSITION | 5 | 10 | 15 |
| | 🔔 IN ANY POSITION | 2 | 4 | 6 |

ALL MALFUNCTIONS VOID ALL PLAYS AND PAYS

FIG. 10

ELECTRONIC GAMING MACHINE AND SYSTEM WITH A WHEEL FEATURE MODE DEPENDENT ON BASE GAME OUTCOMES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

Class 2 electronic gaming systems and/or EGMs present awards and/or outcomes of a primary game to the player as awards and/or outcomes of a secondary game. For example, a Class 2 EGM may operate a bingo or keno game as a primary game, and present the outcome of the bingo or keno game to a player via a slot game simulation. Class 2 games were developed as a response to certain government regulations that only allow certain games (e.g., bingo and/or keno games) to be operated in certain areas. As the simulation is not determinative of the game outcome, the Class 2 EGM complies with the government regulation. Keeping the player continually engaged and/or excited by the simulation can be challenging. However, to achieve or maintain such engagements raises a number of technical challenges in gaming technology and game designs. For example, adjusting any game and/or awards may include complying with jurisdictional requirements, such as, for example, maintaining some return-to-player (RTP) percentages, while clearly presenting visual changes on any graphical interfaces with adequate processing speed without burdening a player with determining how a game has been won and/or has been changed.

SUMMARY

Machines, systems and methods are provided for Class 2 electronic gaming machines with an incrementable and displayable feature wheel mode dependent on a primary game, substantially as shown in and/or described in connection with at least one of the figures, as set forth more completely in the claims.

Various examples of the present disclosure are directed to Class 2 electronic gaming machines, systems and methods. Some Class 2 electronic gaming machines, systems and methods present a primary game. The primary game may be a bingo game configuration that provides a bingo game outcome (and/or associated bingo game award) to a player via a spinning reel (and/or slot) game simulation, sometimes referred to as a reel-simulated bingo game. The sum of the one or more spinning reel game awards may be equal to the bingo game award. Conventional Class 2 games sometimes provide multiple winning bingo game patterns, with each winning bingo game pattern having its own bingo game outcome and/or award. However, some Class 2 games have now evolved to only award the highest priority winning bingo game pattern.

In some examples, the bingo game outcome (and/or bingo game award) may trigger a feature wheel mode or a free spin mode, or both. In addition to or in lieu of a free spin mode, this disclosure contemplates presenting a wheel feature mode with one or more wheel feature awards that sum to a single award associated with a single bingo game outcome and/or winning bingo game pattern. The wheel slice values may be increased before or following each wheel spin such that no wheel slice amount is less than the last winning wheel spin. That is, the wheel slices may be upgraded with each spin to have a value that is equal to or greater than the previous wheel spin award.

During the feature wheel mode, one or more feature wheels or pointers are animated to present results in outcomes provided based on the primary game. The feature wheel includes slices, where each wheel slice defines an initial value. The number of wheel feature spins depends on the bingo game outcome (and/or bingo game award), where the higher the number of winning bingo pattern outcomes, the more feature wheel spins that are provided to present the corresponding bingo awards. Increasing wheel slices with each spin and ordering the award presentations according to increasing award amount, instead of, e.g., presenting an overall award amount, during feature wheel mode may further increase player satisfaction, engagement and/or excitement.

To mitigate technical challenges discussed, such as jurisdictional compliance, gaming technologies, and user-interface capabilities, the present disclosure describes how upgrading a wheel slice on a wheel, when selected, effectively eliminates one or more prizes in a sorted prize look up table. Such reduction or wheel slice adjustment ensures, for example, shortening a sorted prize look up table, which in turn leads to smaller look-up tables for awarding a prize from the wheel, and increasing processing speed and less memory access, while maintaining RTP based on jurisdiction requirements.

One embodiment provides an electronic gaming machine that includes a user interface that receives a user input, a display device operable to display a reel-simulated bingo game, and a game controller. The game controller comprises at least one processor and a memory storing instructions. When executed, the instructions cause the at least one processor to initiate the reel-simulated bingo feature game. The instructions may also cause the at least one processor to generate, in response to an occurrence of a feature mode trigger condition, a feature wheel including a plurality of wheel slices populated with a plurality of wheel slice values, respectively. In response to receiving one or more user inputs during the reel-simulated bingo game, the instructions may also cause the at least one processor to rotate the feature wheel a first time for a first of one or more bingo game awards based on one or more bingo outcomes generated from at least one random number generated by a random number generator. A feature wheel outcome is determined and a first wheel slice value is determined from the feature wheel based on the first of one or more bingo game awards. In response to determining that one or more bingo game awards includes a second bingo game award, the instructions may also cause the at least one processor to re-populate the plurality of wheel slice values to have at least the first wheel slice value and rotate the feature wheel a second time.

Another embodiment provides a method of displaying a feature game on a gaming system. The gaming system comprises a) a plurality of gaming devices, the gaming devices having user interfaces operable to receive a user input and display devices, and b) a game controller comprising at least one processor and a memory storing instructions. When executed, the instructions cause the at least one processor to initiate a reel-simulated bingo game. The method may include displaying a set of bingo game outcomes in the reel-simulated bingo game on the display devices, the set of bingo game outcomes being associated with a bingo award, and displaying, in response to an occurrence of a wheel feature mode trigger condition in the reel-simulated bingo game on one or more of the gaming devices, a feature wheel including a plurality of wheel slices and a plurality of wheel slice values, respectively, for a first outcome of the set of bingo game outcomes. The method may also include animating, in response to receiving the user input from the one or more of the gaming devices while displaying the feature wheel, at least one of a plurality of consecutive wheel rotations of the feature wheel on the display device, the plurality of consecutive wheel rotations of the feature wheel presenting one or more feature wheel outcomes, a sum of the one or more feature wheel outcomes equaling to the bingo award, wherein each feature wheel outcome of the one or more feature wheel outcomes comprises at least one wheel slice value, and re-populating the plurality of wheel slices with different wheel slice values greater than or equal to a first wheel slice value, corresponding to the first outcome of the set of bingo game outcomes, for a second outcome of the set of bingo game outcomes.

Yet another embodiment provides a non-transitory computer-readable medium for operating a reel-simulated bingo game on a gaming system. The gaming system may include a user interface operable to receive a user input at a gaming device, at least one display device, and a gaming server comprising at least one processor and a memory storing a) a plurality of winning bingo patterns and b) one or more sequences of instructions. The one or more sequences of instructions, when executed, cause the at least one processor to determine a bingo game outcome in the reel-simulated bingo game, the bingo game outcome being associated with one or more of the winning bingo patterns and a bingo game award, and to control the display device, in response to an occurrence of a wheel feature mode trigger condition in the reel-simulated bingo game, to display a feature wheel including a plurality of wheel slices populated with a plurality of wheel slice values. In response to receiving the user input at the gaming device, the one or more sequences of instructions, when executed, may also cause the at least one processor to control the display device to animate at least one of a plurality of consecutive wheel rotations of the feature wheel, and to determine one or more feature wheel outcomes and a sum of the one or more feature wheel outcomes being equal to the bingo game award, each of the one or more feature wheel outcomes having at least one of the plurality of wheel slice values. A first wheel slice value associated with a first of the winning bingo patterns may be selected from the plurality of wheel slices. In response to at least one of the one or more winning bingo patterns remaining, the one or more sequences of instructions, when executed, may also cause the at least one processor to control the display device to display the plurality of wheel slices with re-populated wheel slice values greater than or equal to the first wheel slice value.

Various advantages and features of the present disclosure will become apparent and more clearly understood in view of the detailed description, appended claims, and/or drawings of the present disclosure. In the following description, reference is made to drawings which show by way of illustration various disclosed examples that incorporate various examples of the present disclosure. These examples are described in sufficient detail to enable those skilled in the art to make or use the disclosed examples. Other examples may be utilized and other structural, logical, software, hardware, and electrical changes may be made without departing from the scope of the appended claims. The following description is, therefore, not to be taken in a limited sense.

DRAWING DESCRIPTIONS

Examples of the disclosure will now be described with reference to the accompanying drawings in which:

FIGS. 1A-C are example diagrams showing several EGMs networked with various gaming related servers.

Figure 5:
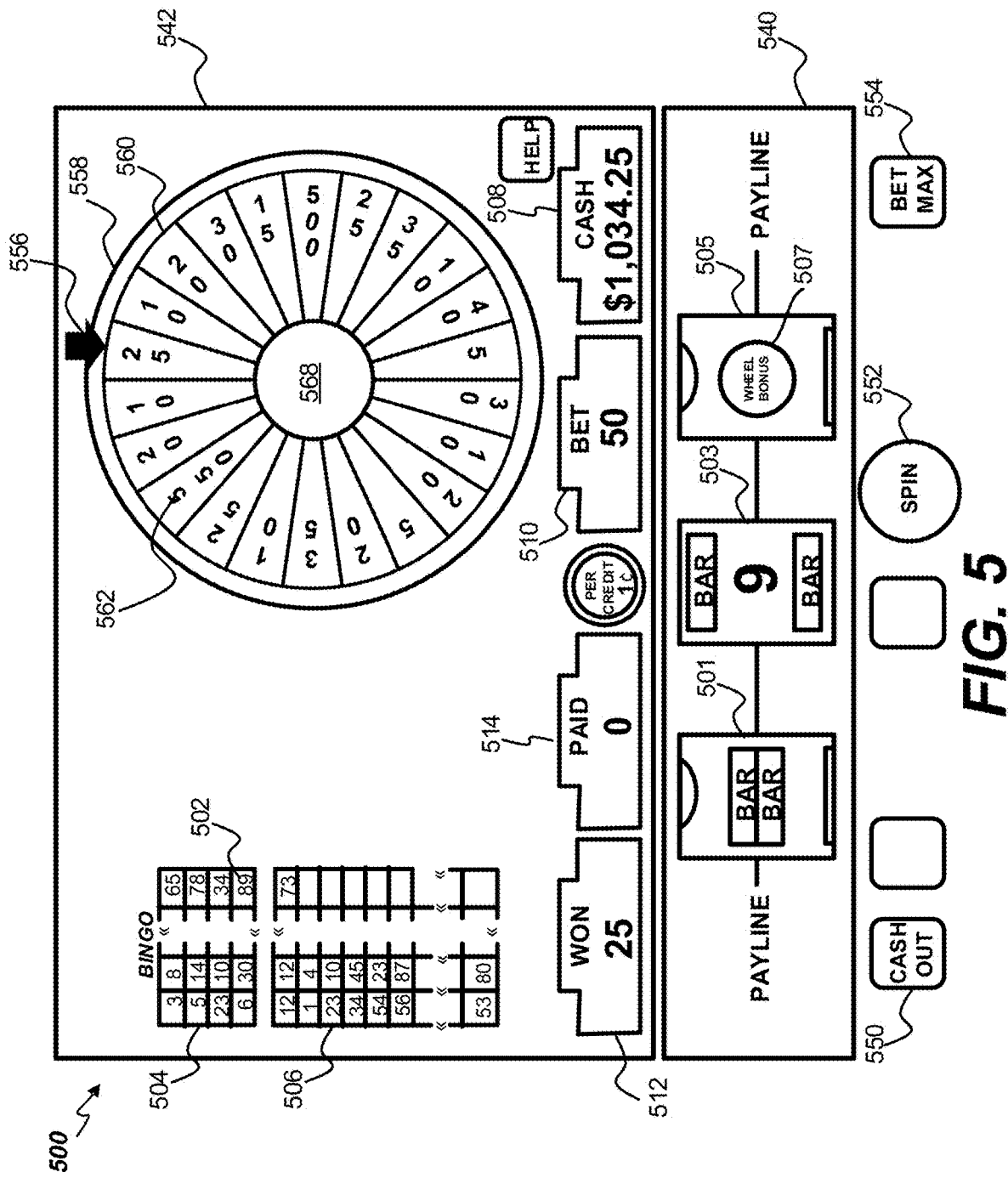
Figure 6:
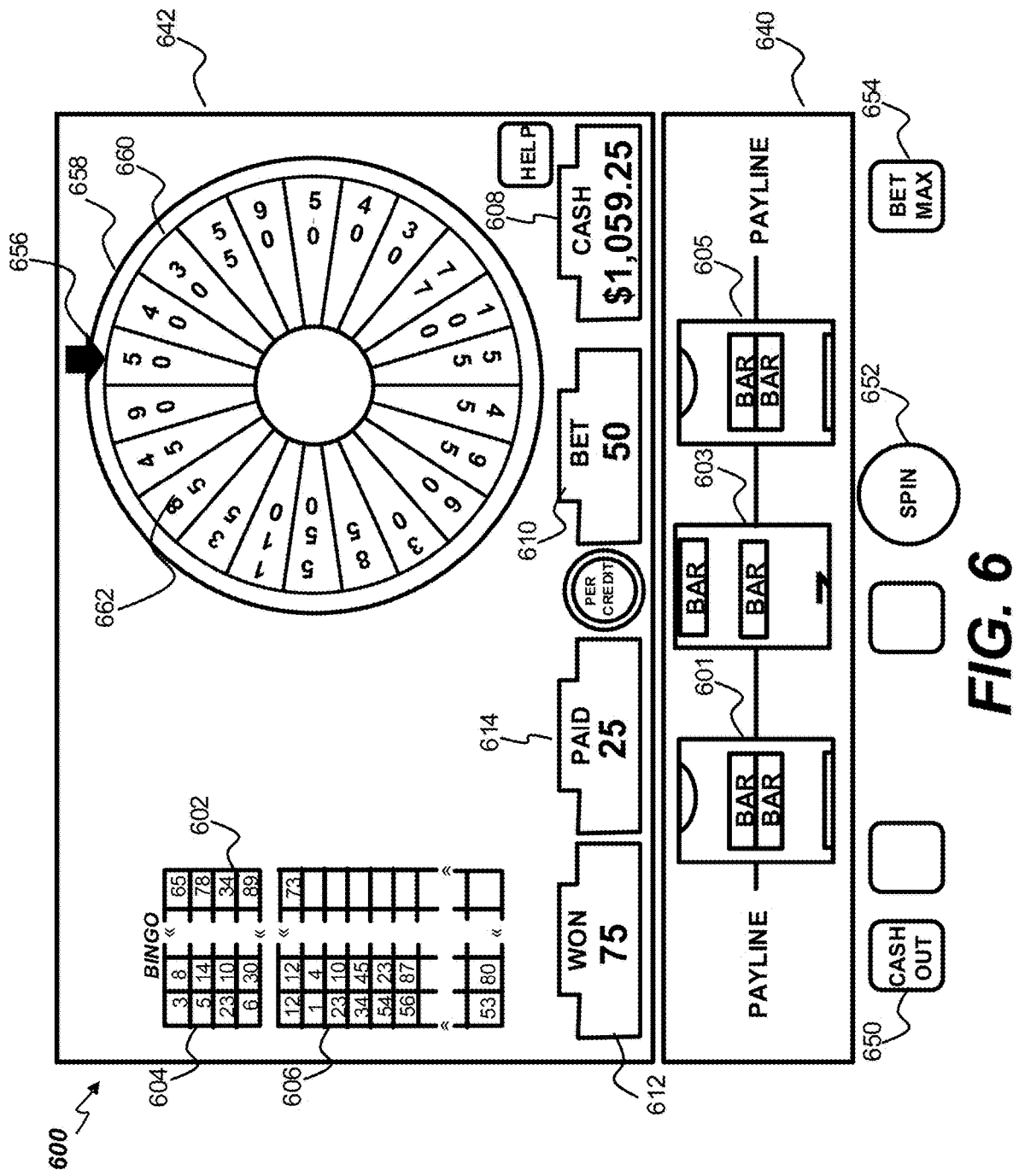
Figure 7:
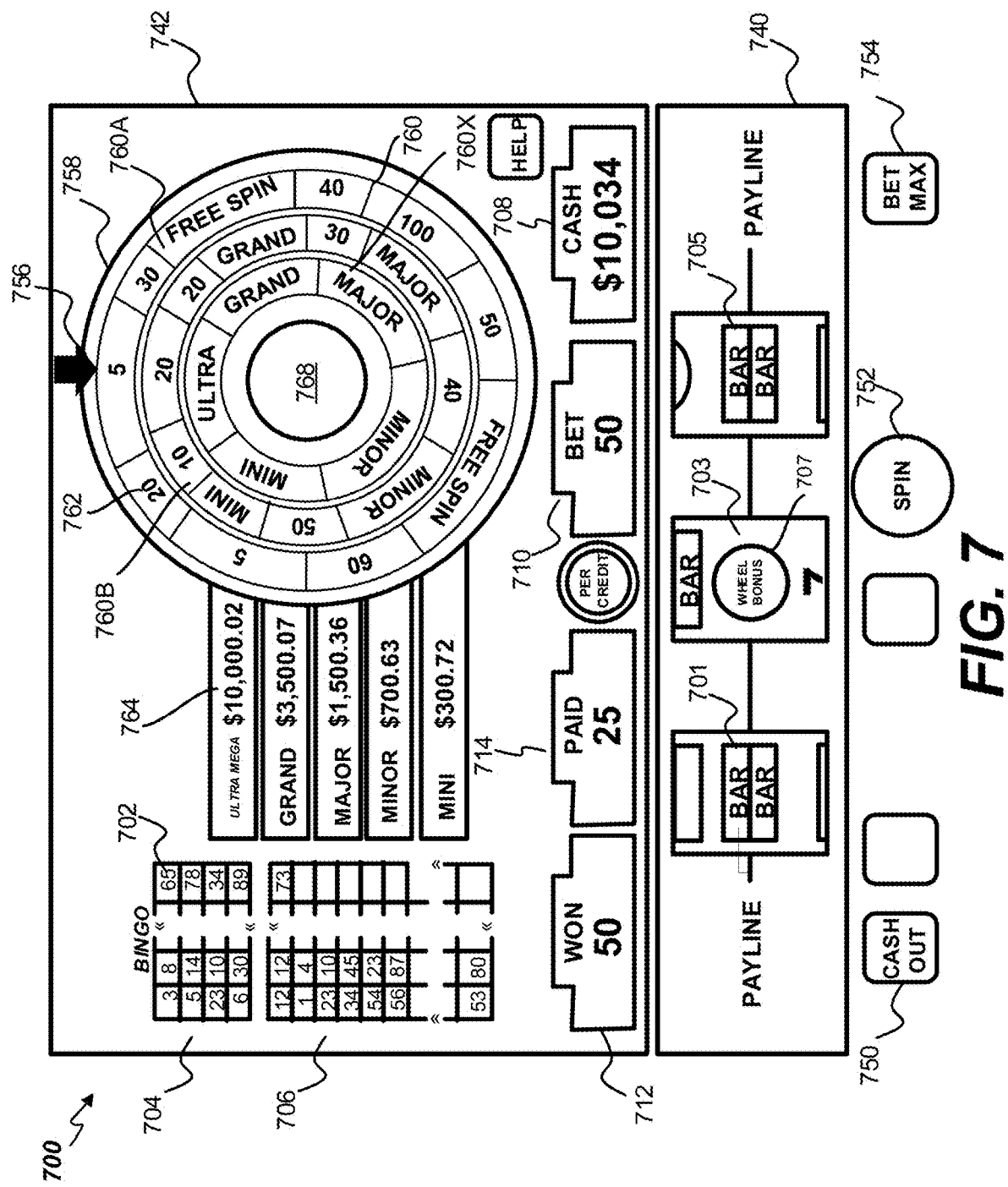

FIGS. 5, 6, and 7 are examples of a Class 2 game graphical user interface displaying a wheel feature mode conducted based on a base game outcome.

FIGS. 8, 9A, 9B, 9C, and 9D are exemplary screen shots of a Class 2 game graphical user interface that are employed via an EGM to display a wheel feature mode with a jackpot feature conducted based on a base game outcome.

FIG. 10 illustrates an exemplary symbol combination pay table.

Figure 11A:
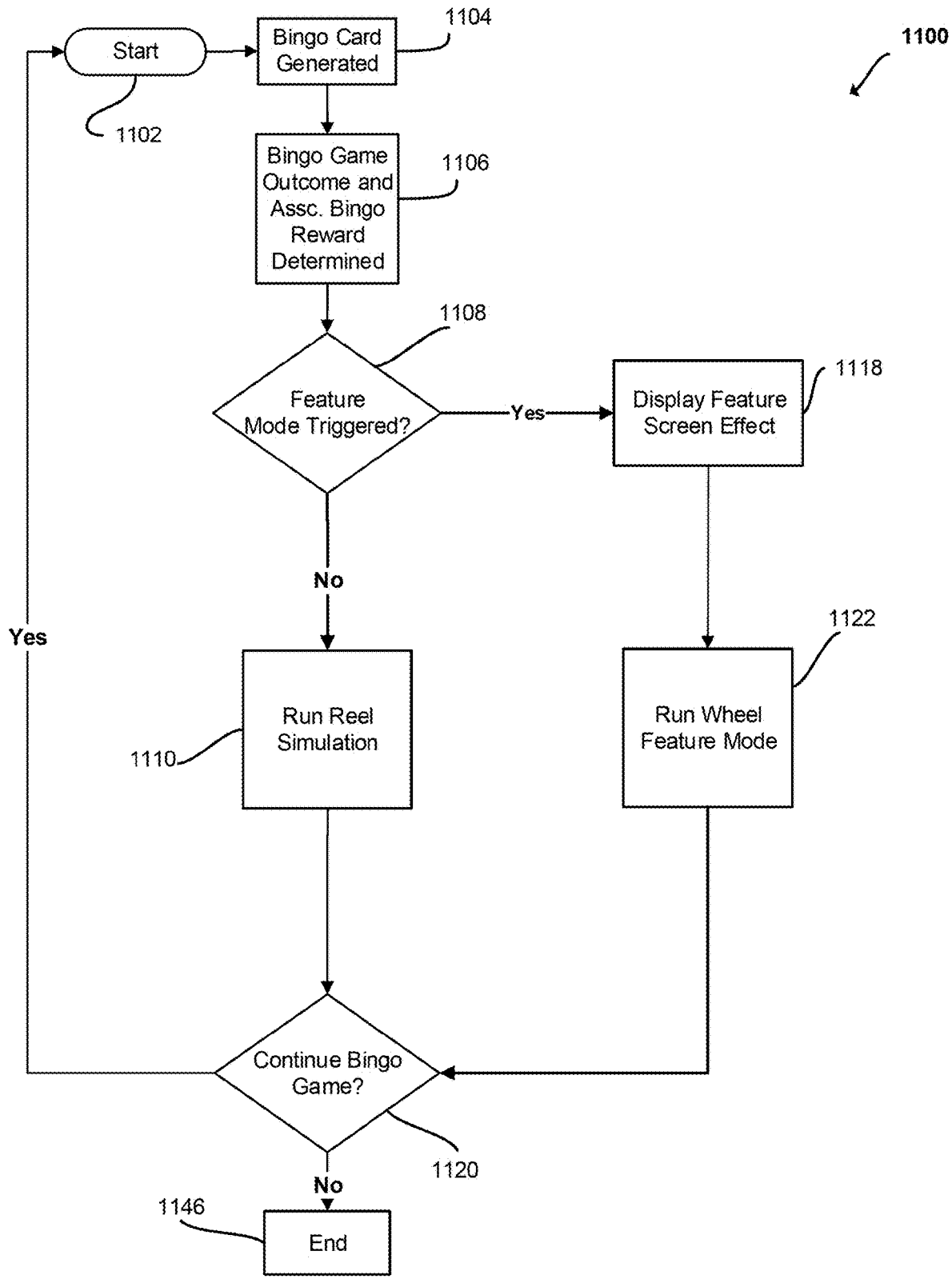
Figure 11B:
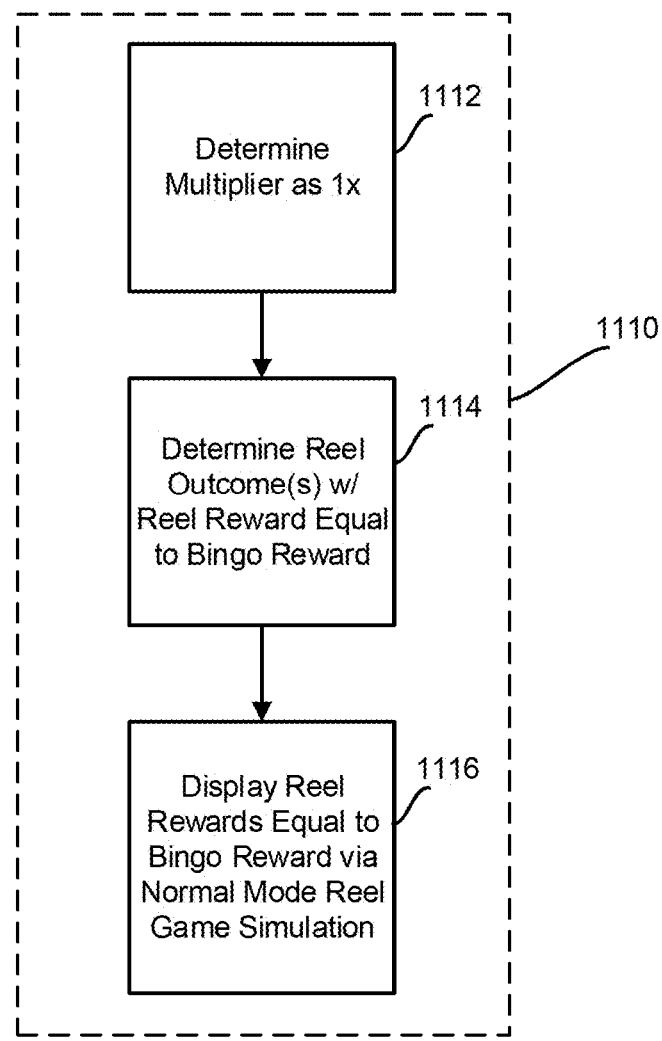
Figure 11C:
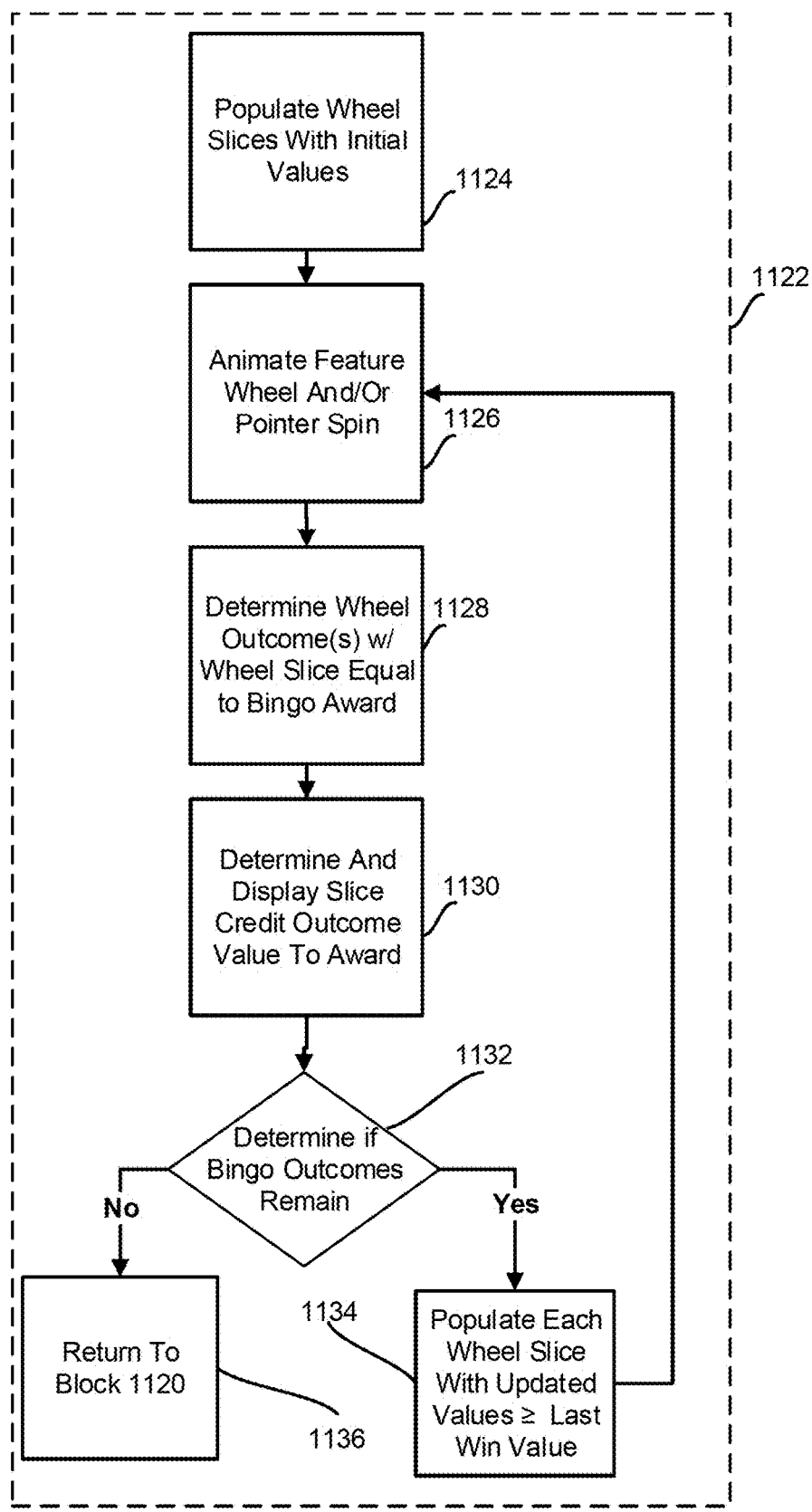

FIG. 11A-C form an example of a control process that may be used to conduct the Class 2 game employing a wheel feature mode conducted based on base game outcomes.

The figures are not necessarily to scale. Various dimensions may be exaggerated for illustrative clarity. Where appropriate, similar or identical reference numerals are used to refer to similar or identical components.

DETAILED DESCRIPTION

A gaming machine is disclosed with a wheel feature mode dependent on base game outcomes. The wheel feature mode may be used to present multiple concurrent bingo pattern outcomes through a sequence of wheel spins, where following each wheel spin and award of a prize, the wheel slice values are upgraded such that the minimum wheel slice credit value is equal to or greater than the previous award.

Embodiments of the present disclosure represent a technical improvement in the art of electronic gaming machines, systems, and operating for such electronic gaming machines or systems. For example, embodiments of the present disclosure allow a bingo game outcome to be simulated through the wheel feature mode. Specifically, embodiments allow winning outcomes and amounts to be displayed using a wheel feature with multiple wheel spins, where each spin of the wheel has the potential to provide an amount greater than the previous spin, thereby increasing the anticipation to a player of the electronic gaming machine. By relying on the base game outcomes to present a wheel feature, the wheel feature mode does not overly burden the player or designers with an added layer of complicated rules and calculations for a stand-alone gaming feature, which may reduce burdens caused by such rules and calculations on the gaming machine hardware.

Additionally, at least some embodiments of the present disclosure provide additional functionality in an electronic gaming machine to visually transform a base game mode into a wheel feature dependent on the base game outcomes. The wheel feature mode is a visual transformation of one base game mechanic (e.g., a bingo game) into a wheel feature that still complies with regulatory requirements for the bingo game operation. Embodiments of such a wheel feature mode engages the player by transforming base game outcomes into a spinning wheel feature in the graphical user interface. The wheel feature mode presents outcomes of the base game and, at the same time, communicates to the player increasing wheel slice values with each subsequent spin. Further, the visual modification of game characteristics also provides an improved game machine display such that the player may only need to focus on the feature wheel during the feature mode as the wheel is spun, the wheel values being displayed visually, and visually increasing with each increasing spin. Increasing wheel slices with each spin and ordering the award presentations according to increasing amount of base awards, instead of overall award, during feature wheel mode may further increase player satisfaction, engagement and/or excitement.

The display of an increase in the wheel values graphically conveys to a player a larger award is being made available. As such, the player may anticipate the possibility of obtaining an immediate additional benefit, above and beyond the other potential awards of a base game, based on wheel spin. Further, if the award of a feature mode is triggered, the player's anticipation may be enhanced by the potential immediate additional benefits that may be obtained based on the feature wheel prizes that land during instances of feature wheel or free spin bonus games.

Embodiments of the present disclosure are not merely new game rules or simply new display patterns, but provide technologic improvements to game display in the art of electronic gaming machines and software for such electronic gaming machines. For example, in some embodiments, the graphical increase in the wheel values may be used in any Class II gaming machines, thus improving existing gaming technology by incorporating a wheel feature dependent on Class 2 game outcomes. Moreover, the above example is not intended to be limiting, but merely exemplary of technological improvements provided by some embodiments of the present disclosure. Technological improvements of other embodiments are readily apparent to those of ordinary skill in the art in light of the present disclosure.

Figure 1A:
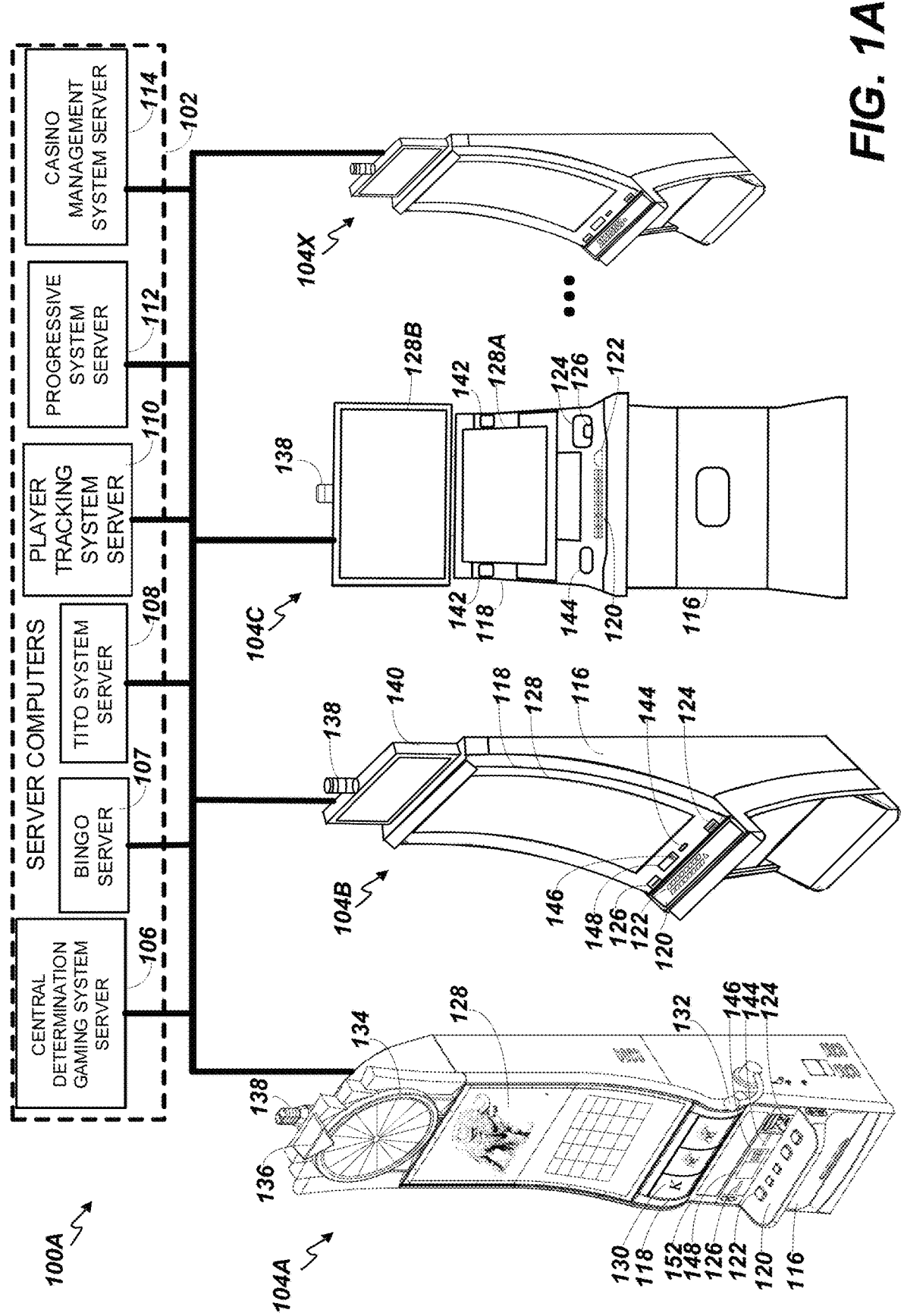

FIG. 1A illustrates a system 100A in a gaming environment. As shown, FIG. 1A illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some examples, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

In the example of FIG. 1A, the server computers 102 may include a central determination gaming system server 106, a bingo server 107, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

In some examples, bingo game outcomes (e.g., for Class 2 reel-simulated bingo game implementations) may be generated and/or determined on the bingo server 107, such as during the play of Class 2 bingo, and then transmitted over the network to any the EGMs 104A-104X. The game instance may be communicated to EGM 200 via the network 214, as shown FIG. 2, and then displayed on EGM 200. For example, the bingo server 107 may generate a set of bingo numbers (e.g., a ball call), provide the bingo numbers to EGM 200 to compare with bingo card numbers, and/or determine a bingo game award that may then be displayed via the EGM 200. In some examples, a keno game instance (rather than a bingo game instance) may be generated using bingo server 107. In some examples, the bingo server 107 may be implemented and/or embodied in one of the other server computers 102.

In the example of FIG. 1A, gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1A, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In some examples, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some examples, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some examples, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

Figure 2A:
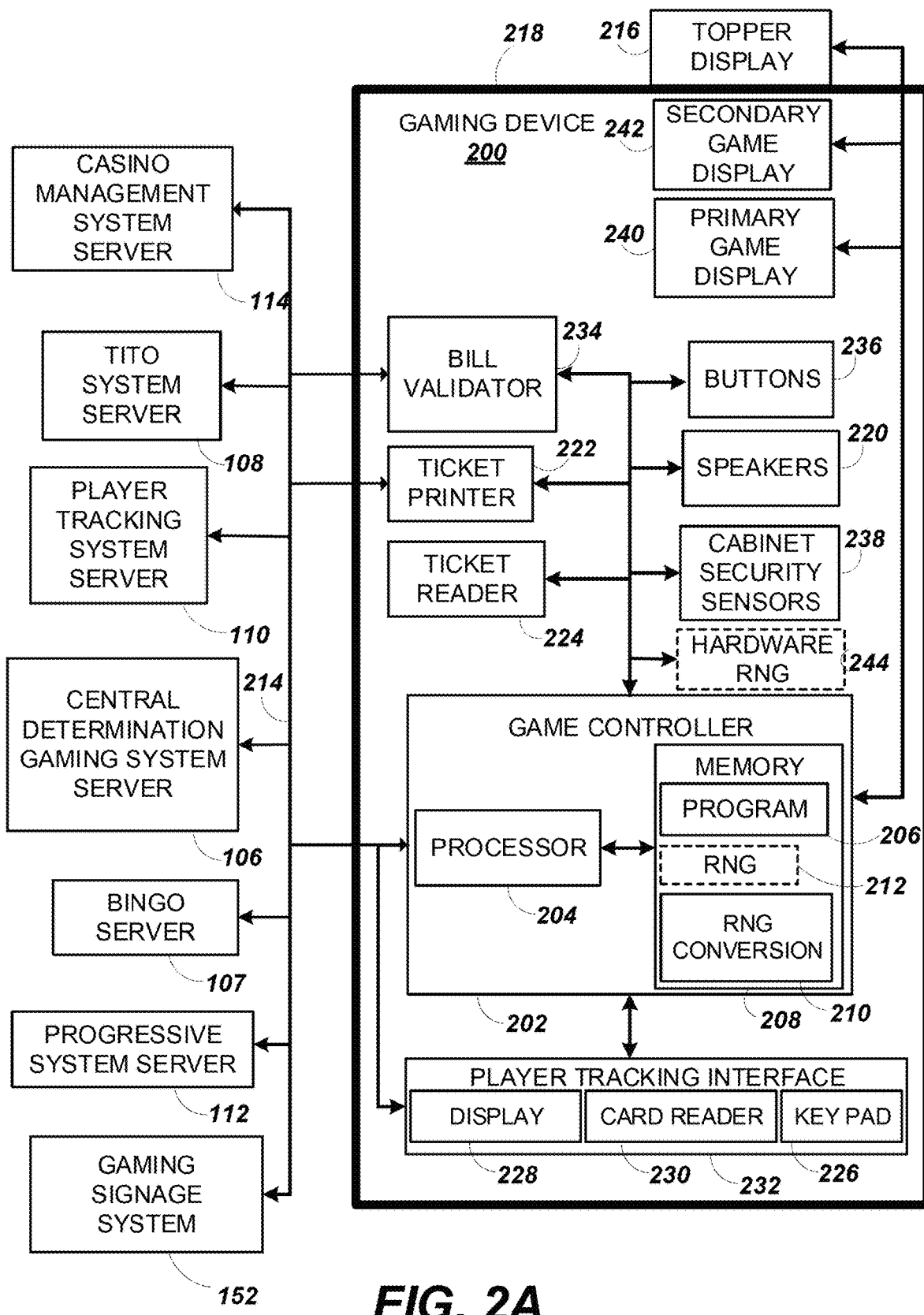
FIG. 2A is a block diagram showing various functional elements of an example EGM.

Gaming devices 104A have traditionally also included a handle 132 typically mounted to the side of main cabinet 116 which may be used to initiate game play. Many or all the above described components can be controlled by circuitry (e.g., a gaming controller) housed inside the main cabinet 116 of the EGM 104, the details of which are shown in FIG. 2A.

Note that not all EGMs suitable for implementing examples of the present disclosure necessarily include top wheels, top boxes, information panels, cashless ticket systems, and/or player tracking systems. Further, some suitable EGMs have only a single game display that includes only a mechanical set of reels and/or a video display, while others are designed for bar counters or table tops and have displays that face upwards.

An alternative example gaming device 104B illustrated in FIG. 1A is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some examples, the main display 128A may be used to provide a reel simulation dependent on another primary game, like a bingo game. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 1B:
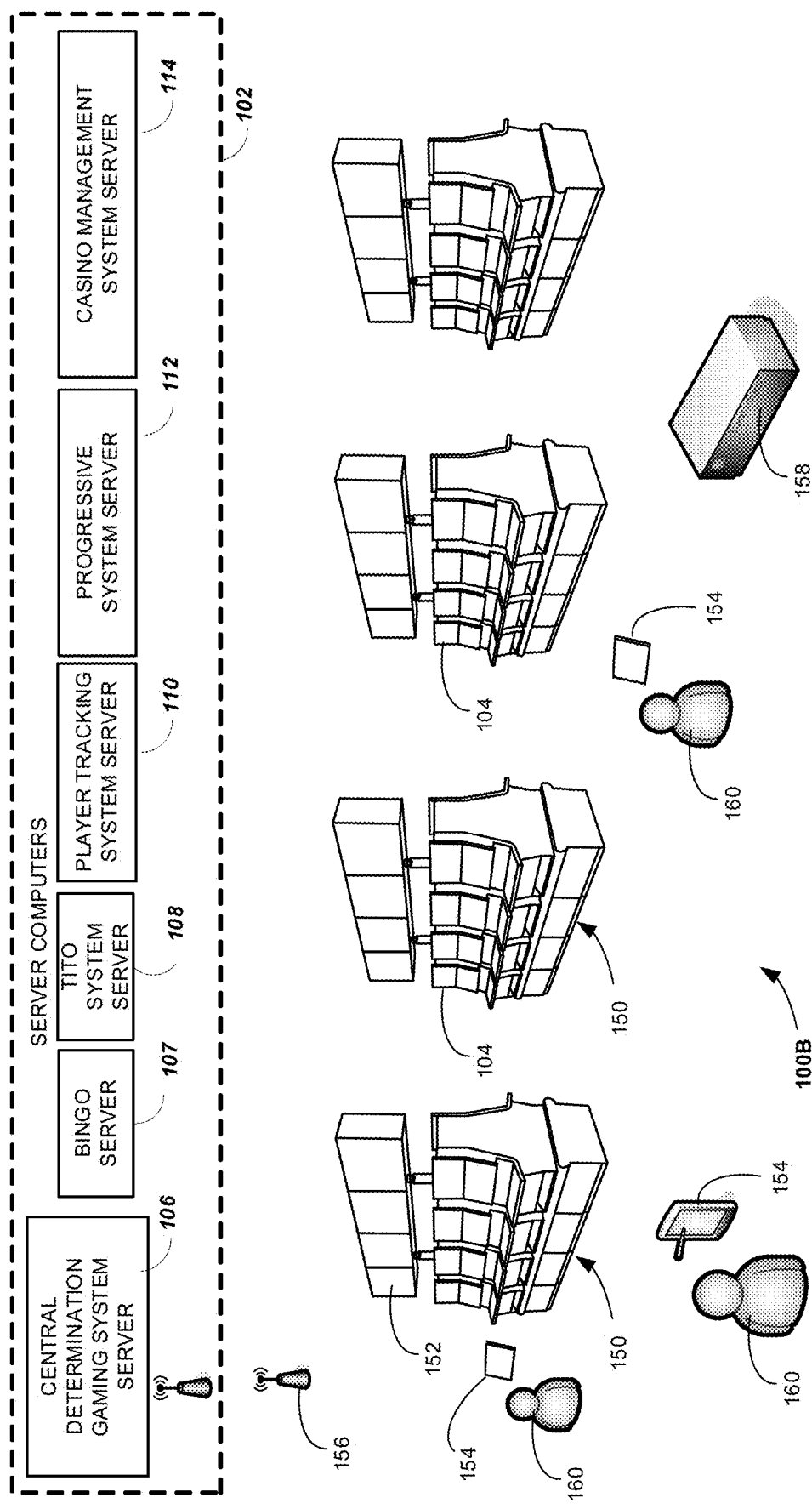

FIG. 1B depicts a casino gaming environment according to one example. In this example, the casino 100B includes banks 150 of EGMs 104. In this example, each bank 150 of EGMs 104 includes a corresponding gaming signage system 152. According to this implementation, the casino 100B also includes mobile gaming devices 154, which are also configured to present wagering games in this example. The mobile gaming devices 154 may, for example, include tablet devices, cellular phones, smart phones and/or other handheld devices. In this example, the mobile gaming devices 154 are configured for communication with one or more other devices in the casino 100B, including but not limited to one or more of the server computers 102, via wireless access points 156. Devices 154 may, for example, include tablet devices, cellular phones, smart phones and/or other handheld devices. In this example, the mobile gaming devices 154 are configured for communication with one or more other devices in the casino 100B, including but not limited to one or more of the server computers 102, via wireless access points 156.

According to some examples, the mobile gaming devices 154 may be configured for stand-alone determination of game outcomes. However, in some alternative implementations the mobile gaming devices 154 may be configured to receive game outcomes from another device, such as the central determination gaming system server 106, one of the EGMs 104, etc.

Some mobile gaming devices 154 may be configured to accept monetary credits. Some mobile gaming devices 154 may be configured to accept monetary credits from a credit or debit card, via a wireless interface (e.g., via a wireless payment app), via tickets, via a patron casino account, etc. However, some mobile gaming devices 154 may not be configured to accept monetary credits via a credit or debit card. Some mobile gaming devices 154 may include a ticket reader and/or a ticket printer whereas some mobile gaming devices 154 may not, depending on the particular implementation.

In some implementations, the casino 100B may include one or more kiosks 158 that are configured to facilitate monetary transactions involving the mobile gaming devices 154, which may include cash out and/or cash in transactions. The kiosks 158 may be configured for wired and/or wireless communication with the mobile gaming devices 154. The kiosks 158 may be configured to accept monetary credits from casino patrons 160 and/or to dispense monetary credits to casino patrons 160 via cash, a credit or debit card, via a wireless interface (e.g., via a wireless payment app), via tickets, etc. According to some examples, the kiosks 158 may be configured to accept monetary credits from a casino patron and to provide a corresponding amount of monetary credits to a mobile gaming device 154 for wagering purposes, e.g., via a wireless link such as a near-field communications link. In some such examples, when a casino patron 160 is ready to cash out, the casino patron 160 may select a cash out option provided by a mobile gaming device 154, which may include a real button or a virtual button (e.g., a button provided via a graphical user interface) in some instances. In some such examples, the mobile gaming device 154 may send a "cash out" signal to a kiosk 158 via a wireless link in response to receiving a "cash out" indication from a casino patron. The kiosk 158 may provide monetary credits to the patron 160 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 154 and/or a kiosk 158.

Some mobile gaming devices 154 may be configured for receiving and/or transmitting player loyalty information. For example, some mobile gaming devices 154 may be configured for wireless communication with the player tracking system server 110. Some mobile gaming devices 154 may be configured for receiving and/or transmitting player loyalty information via wireless communication with a patron's player loyalty card, a patron's smartphone, etc.

According to some implementations, a mobile gaming device 154 may be configured to provide safeguards that prevent the mobile gaming device 154 from being used by an unauthorized person. For example, some mobile gaming devices 154 may include one or more biometric sensors and may be configured to receive input via the biometric sensor(s) to verify the identity of an authorized patron. Some mobile gaming devices 154 may be configured to function only within a predetermined or configurable area, such as a casino gaming area.

FIG. 1C is a diagram that shows examples of components of a system for providing an online gaming network 100C according to some aspects of the present disclosure. As with other figures presented in this disclosure, the numbers, types and arrangements of devices shown in FIG. 1C are merely shown by way of example. In this example, various devices, including but not limited to end user devices (EUDs) 170a, 170b and 170c are capable of communication via one or more networks 417. The networks 417 may, for example, include one or more cellular telephone networks, the Internet, etc. In this example, the EUDs 170a is a tablet device and 170b is a mobile device. In this implementation, the EUD 170c is a laptop computer that is located within a residence 172 at the time depicted in FIG. 1C. Accordingly, in this example the hardware of EUDs is not specifically configured for online gaming, although each EUD is configured with software for online gaming. Other implementations may include other types of EUD, some of which may be specifically configured for online gaming.

In this example, a gaming data center 174 includes various devices that are configured to provide online wagering games via the networks 417. The gaming data center 174 is capable of communication with the networks 417 via the gateway 176. In this example, switches 178 and routers 180 are configured to provide network connectivity for devices of the gaming data center 174, including storage devices 182, servers 184 and one or more workstations 186. The servers 184 may, for example, be configured to provide access to a library of games for online game play. In some examples, code for executing at least some of the games may initially be stored on one or more of the storage devices 182. The code may be subsequently loaded onto a server 184 after selection by a player via an EUD and communication of that selection from the EUD via the networks 417. The server 184 onto which code for the selected game has been loaded may provide the game according to selections made by a player and indicated via the player's EUD. In other examples, code for executing at least some of the games may initially be stored on one or more of the servers 184. Although only one gaming data center 174 is shown in FIG. 1C, some implementations may include multiple gaming data centers 174.

In this example, a financial institution data center 188 is also configured for communication via the networks 417. Here, the financial institution data center 188 includes servers 190, storage devices 192, and one or more workstations 194. According to this example, the financial institution data center 188 is configured to maintain financial accounts, such as checking accounts, savings accounts, loan accounts, etc. In some implementations one or more of the authorized users 196a-196c may maintain at least one financial account with the financial institution that is serviced via the financial institution data center 188.

According to some implementations, the gaming data center 174 may be configured to provide online wagering games in which money may be won or lost. According to some such implementations, one or more of the servers 184 may be configured to monitor player credit balances, which may be expressed in game credits, in currency units, or in any other appropriate manner. In some implementations, the server(s) 184 may be configured to obtain financial credits from and/or provide financial credits to one or more financial institutions, according to a player's "cash in" selections, wagering game results and a player's "cash out" instructions. According to some such implementations, the server(s) 184 may be configured to electronically credit or debit the account of a player that is maintained by a financial institution, e.g., an account that is maintained via the financial institution data center 188. The server(s) 184 may, in some examples, be configured to maintain an audit record of such transactions.

In some alternative implementations, the gaming data center 174 may be configured to provide online wagering games for which credits may not be exchanged for cash or the equivalent. In some such examples, players may purchase game credits for online game play, but may not "cash out" for monetary credit after a gaming session. Moreover, although the financial institution data center 188 and the gaming data center 174 include their own servers and storage devices in this example, in some examples the financial institution data center 188 and/or the gaming data center 174 may use offsite "cloud-based" servers and/or storage devices. In some alternative examples, the financial institution data center 188 and/or the gaming data center 174 may rely entirely on cloud-based servers.

One or more types of devices in the gaming data center 174 (or elsewhere) may be capable of executing middleware, e.g., for data management and/or device communication. Authentication information, player tracking information, etc., including but not limited to information obtained by EUDs 170a-c and/or other information regarding authorized users of EUDs 170a-c (including but not limited to the authorized users 196a-c), may be stored on storage devices 182 and/or servers 184. Other game-related information and/or software, such as information and/or software relating to leaderboards, players currently playing a game, game themes, game-related promotions, game competitions, etc., also may be stored on storage devices 182 and/or servers 184. In some implementations, some such game-related software may be available as "apps" and may be downloadable (e.g., from the gaming data center 174) by authorized users.

In some examples, authorized users and/or entities (such as representatives of gaming regulatory authorities) may obtain gaming-related information via the gaming data center 174. One or more other devices (such EUDs 170a-c or devices of the gaming data center 174) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

FIG. 2A is a block diagram depicting exemplary internal electronic components of a gaming device 200 connected to various external systems. All or parts of the example gaming device 200 shown could be used to implement any one of the example gaming devices 104A-X depicted in FIG. 1A-B. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking.

FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202. In some examples, the display interface(s) above may include or complement one or more user interfaces, such as a touch screen, one or more buttons, a gesture recognition system, a voice recognition system, etc.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class 2 gaming device where RNG 212 generates RNG outcomes for creating Bingo cards and Bingo game ball calls. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

Although FIGS. 1A-B and 2 illustrate specific embodiments of a gaming device (e.g., gaming devices 104A-104X and 200), the disclosure is not limited to those embodiments shown in FIGS. 1A-B and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
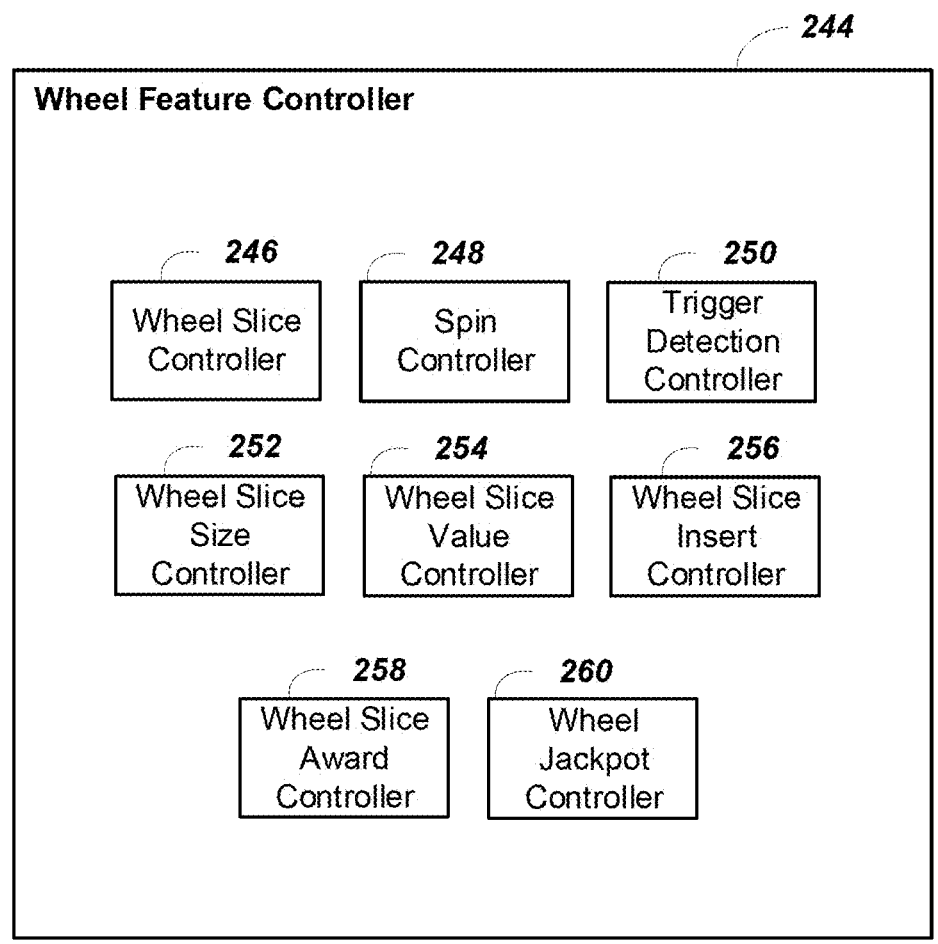
FIG. 2B is a block diagram showing various functional elements of an example feature wheel controller.

FIG. 2B illustrates an example wheel feature controller that may be employed to implement with various embodiments in an EGM system. Referring to FIG. 2B, a gaming machine, similar to the EGM 200 of FIG. 2A, may include a wheel feature controller 244. The wheel feature controller 244 may utilize hardware and/or software to control the wheel feature mode. The wheel feature controller 244 may be a part of the game controller 202 or a standalone module. In some configurations, it includes additional processor and a memory to further improve EGM speed and data throughput of the embodiments disclosed. For example, such memory may comprise, among other things, memory for a symbol memory module to store data of a plurality of wheel slices and graphical information, memory for storing wheel feature meter data of gaming machine 200, memory that stores wheel feature program code to implement a number of the wheel feature modules, and memory for storing a plurality of wheel feature rules.

In some cases, the memory may also store a number of different wheel slice lookup tables, each of the different wheel slice lookup tables may list a number of awards to be displayed on the wheel. For example, a first wheel slice lookup table may list an initial number of awards displayable on the wheel, and a second wheel slice lookup table may list a second number of awards displayable on the wheel after one or more awards from the first wheel slice lookup table have been upgraded. In some cases, the second number of awards in the second wheel slice lookup table is less than the initial number of awards in the first wheel slice lookup table, which allows for faster memory access when used. In this regard, the memory may store a third wheel slice lookup table that lists a third number of awards after one or more awards from the second wheel slice lookup table have been upgraded, which allows for shorter memory lookups. That is, the memory may store a number of wheel slice lookup tables that have progressively less award entries to provide fast memory access when selected. In other cases, the memory may store an initial wheel slice lookup table prepopulated with values based on one or more win pattern amounts. The prepopulated values are dynamically updated or upgraded based at least in part on game activities.

In some embodiments, the wheel feature controller 244 may communicate with one or more of the game device 200 components, e.g., the display, game controller and player interfaces. In the embodiment shown, wheel feature controller 244 includes a wheel slice controller 246 operable to populate a feature wheel, e.g., feature wheel 558 in FIG. 5, having a plurality of wheel slices, e.g., wheel slices 560. The wheel feature controller 244 may also include a spin controller 248 that controls how a feature wheel or a feature wheel pointer, e.g., wheel pointer 556 in FIG. 5, are spun or simulated to spin. For example, the spin controller 248 controls a speed at which a feature wheel may be spun. A trigger detection controller 250 may detect and determine if a trigger to initiate a wheel feature mode or if an outcome has resulted, e.g., all winning bingo patterns have been presented during the wheel feature mode.

In some embodiments, a wheel slice size controller 252 may be employed to change the size of the wheel slice sizes displayed or animated during game operation. A change in wheel slice size may be employed to graphically emphasize a win or to adjust the feel of play to a player. For example, the feature wheel may be graphically displayed with enlarged wheel slices relative to other wheel slices during various phases of the wheel feature mode. The feature wheel may be graphically displayed as a three-dimensional wheel on a display 242 or as a three-dimensional hologram.

A wheel slice value controller 254 may increment wheel slice values during the feature wheel mode. For example, when a trigger condition is met (e.g., winning bingo pattern outcomes remain), the wheel slice value controller 254 may increase all the slice values to be equal to or greater than the last credit value outcome, or it may include jackpot or progressive prize slices, e.g., Major, Mini, Major, Minor. In some cases, when a trigger condition is met, a wheel slice insert controller 256 may insert a new or an additional wheel slice(s) onto the feature wheel displayed.

The wheel slice award controller 258 may award a wheel credit when the feature wheel has landed on a wheel slice having a credit value outcome (e.g., a credit amount, free spin, etc.) to award, when the trigger condition has occurred. Additionally, a wheel jackpot controller 260 can be employed to include wheel jackpot slice values, e.g., wheel jackpot slice value 762 in FIG. 7, to add further variability and prize potential to the wheel feature mode. The credit value outcome (e.g., a credit amount, jackpot amount, free spin, car, etc.) may be non-zero credit value outcomes that are awarded. In other embodiments, zero credit value outcomes are possible.

Figure 3:
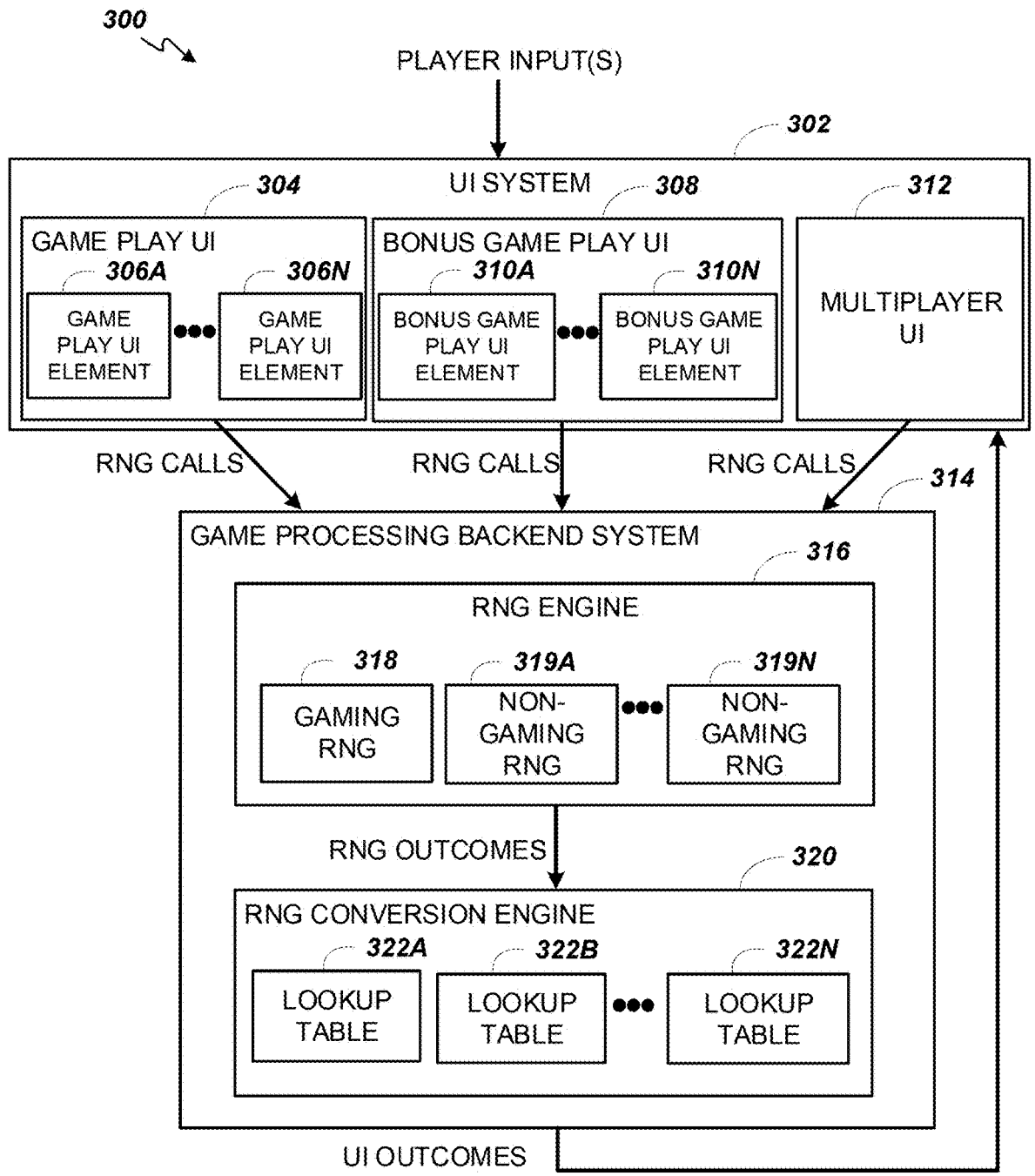
FIG. 3 illustrates, in block diagram form, an example of a game processing architecture algorithm that implements a game processing pipeline for the play of a game in accordance with various embodiments described herein.

FIG. 3 illustrates, in block diagram form, an example of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1A-B and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI elements 306A-306N are similar to the bonus game play UI elements 310A-310N. In other embodiments, the game play UI elements 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N.

Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
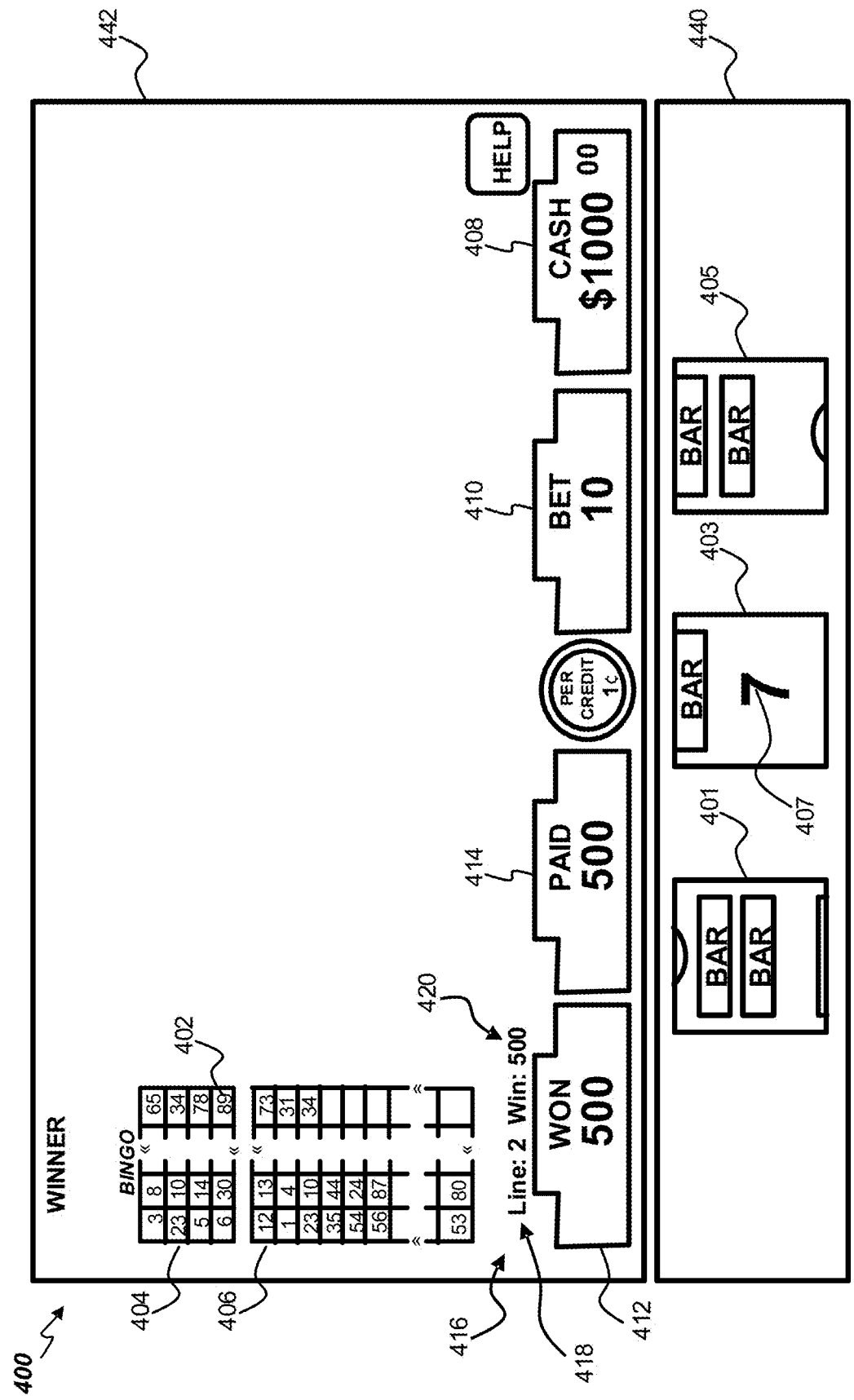
FIG. 4 is an example of a Class 2 game graphical user interface displaying a typical primary or base game mode in the form of bingo.

Turning to FIG. 4, FIG. 4 illustrates an example of a Class 2 bingo game 400 being displayed in a graphical user interface comprising a primary game display 440 and secondary game display 442, similar to displays 240, 242 of the EGM 200 of FIG. 2. The Class 2 bingo game 400 shows a typical primary or base game mode in the form of a reel-simulated bingo game.

In the example of FIG. 4, a plurality of reels 401, 403, and 405 are displayed within the primary game display 440. While only three reels 401, 403, 405 are shown in the example of FIG. 4, in some examples, more or fewer reels may be used. In some examples, the reels 401, 403, and/or 405 may be implemented as mechanical reels. In other examples, the reels 401, 403, and/or 405 may be virtual reels, 2-dimensional reels, and/or 3-dimensional reels. As shown, each reel 401, 403 and 405 has a plurality of symbol display positions for presenting symbols 407 (and/or symbol combinations) which may be associated with winning and/or losing reel game outcomes and/or awards.

In the example of FIG. 4, a bingo card 404 and a bingo number listing 406 are displayed in the secondary game display 442. As shown, the bingo card 404 comprises a matrix of bingo cells 402 (e.g., squares). In some examples, the matrix may be a 5×5 matrix of 25 total cells. In some examples, the bingo card 404 may have a matrix of a different size (e.g., 3×3, 4×4, 4×5, 4×6, 6×6, 7×7, 3×8, 10×10, etc.). In some examples, the matrix may be larger or smaller. In the example of FIG. 4, each cell 402 in the matrix of the bingo card 404 includes a number that is not repeated in any other cell of the bingo card 404.

In the example of FIG. 4, the secondary game display 442 further displays a credit meter 408 showing an amount of money and/or credits (e.g., credit balance) held by a player of the EGM 200. In the example of FIG. 4, the credit balance, illustrated here as "Cash," 408 shows $1000. The secondary display 442 additionally shows a wager meter 410 adjacent to the credit meter 408, under "BET." In the example of FIG. 4, the amount wagered is 10 credits (e.g., $0.10). The amount wagered (e.g., via the user interface) may be deducted from the credit meter 408. The secondary game display 442 additionally displays a win meter 412, illustrated here as "Won," and a total win meter 414, illustrated here as "Paid." In the example of FIG. 4, the win meter 412 shows 500, indicating that the simulated combination of symbols in reels 401, 403, 405 is associated with a 500 credit award (which is equal to the award associated with the bingo game outcome). As shown, the total win meter 414 shows a 500 credit award paid, indicating that the cumulative total of awards received comprises just that one 500 credit award. In the example of FIG. 4, the secondary game display 442 further displays reel win information 416. The reel win information 416 includes win line information 418 and award information 420. The win line information 418 indicates which win line (or pay line) in the reels 401, 403, 405 contains symbols 407 comprising a winning reel game outcome. The award information 420 indicates an associated award amount for that winning reel game outcome.

In some examples, the bingo game may be a networked game that involves two or more networked EGMs 200. The bingo server 107 may manage (and/or host) the bingo game, such as by generating the bingo card 404 and/or bingo number listing 406. In some examples, the bingo card 404 (and/or information on which the bingo card 404 is based), and/or the bingo number listing 406 may be generated using an RNG. In some examples, the bingo card 404 may be randomly selected from a set of bingo cards or a player may select their own bingo card 404 (e.g., via the user interface), such as from a set of randomly generated bingo cards, for example.

In operation, a player and/or EGM 200 may be provided with the bingo card 404, such as by bingo server 107. For example, a player may be provided a new bingo card 404 each time a "Spin" or "Play" button is pressed by the player (e.g., via user interface), provided the player has made a wager. In some examples, more than one bingo card 404 may be generated in response to the wager. The bingo number listing 406 (e.g., "ball call") may be randomly generated, such as by bingo server 107. The bingo card 404 may be compared to the current bingo number listing 406, and numbered cells 402 on the bingo card 404 that match numbers in the bingo number listing 406 may be marked or "daubed" on the bingo card 404. Finally, the marked or daubed bingo card 404 may be evaluated against a paytable of winning bingo patterns.

The bingo number listing 406 may be continually generated until a maximum amount of numbers are listed (e.g., seventy-five numbers listed) or until a game-ending pattern is awarded to a player participating in the reel-simulated bingo game is implemented. A typical game-ending pattern may be a bingo card blackout pattern, in which each of the numbers of a bingo card match a number displayed in the bingo number listing 406. Other game-ending patterns are also possible. When the game-ending pattern is awarded, the bingo number listing 406 is reset, and the process repeats. In some examples, a single play of the bingo game includes a wager, a bingo card, a bingo number listing 406, a matching of the numbers called with those on a bingo card 404, a determination of a bingo game outcome, and a presentation or other graphical display, e.g., animation, of an associated award, if any.

A bingo game outcome may be determined by comparing one or more patterns of marked (and/or "daubed) cells of the bingo card 404 with the paytable of winning bingo patterns. If the bingo card 404 does not include a pattern that matches a pattern in the paytable of winning patterns, then a losing bingo outcome is determined, and no award may be provided to the player. If the bingo card 404 does include a pattern that matches a pattern in the paytable of winning patterns, then a winning bingo outcome is determined, and an award may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g., all winning patterns) that are matched when the bingo card 404 is evaluated against the paytable of winning patterns. In some examples, the player may be awarded for only the highest priority pattern (e.g., the highest paying winning pattern) that is matched. In some examples, during play of a Class 2 game, a player is provided or selects a single bingo card 404 for multiple plays of the bingo game, with a new bingo number listing 406 generated for each play of the bingo game. Other methods of play of a Class 2 bingo game are also possible and are within the scope of this disclosure.

A bingo game win may be presented to the player via a spinning reel game simulation. In the example of FIG. 4, the spinning reel game is simulated via the plurality of reels 401, 403 and 405 in the primary game display 440. For each play of the bingo game, the bingo game win is presented as a win via a reel spin outcome in the reel game. In some examples, the spinning reel game simulation may operate by spinning each reel 401, 403, 405 and then stopping each reel 401, 403, 405 in a particular position to obtain a matrix of symbols. One or more combinations of symbols 407 in the matrix of symbols may be associated with a reel game outcome that pays for the main bingo game win. As such, a winning bingo game outcome may be displayed as a winning combination of reels 401, 403 and 405. Similarly, a losing bingo game outcome may be displayed as a losing combination of reels 401, 403 and 405. Different outcomes or wins of the bingo game may be displayed as different outcomes or combinations in the spinning reel game. Thus, the bingo game outcome is presented to the player as a particular reel spin outcome of reels 401, 403 and 405 that awards the same award as the winning bingo game outcome does.

Returning to FIG. 4, the Class 2 reel bingo game 400 is implemented in a typical mode. In the example of FIG. 4, the secondary game display 442 displays reel win information 416 corresponding to the reel game simulated via the reels 401, 403, 405. As shown, the reel win information 416 shows that win line 2 of the reels 401, 403, 405 comprises a winning combination with a base award amount of 500 credits. Since FIG. 4 is an example of a typical mode of the spinning reel game simulation, there is no feature wheel graphically displayed, and the multiplier is always 1×, and there is only one simulated spin of the reels 401, 403, 405. Thus, the total win meter 414 shows the same award amount as the win meter 412 (i.e., 500 credits).

In the example of FIG. 4, the player is presented with a symbol combination in the reels 401, 403, 405. Had the reel win information 416 instead indicated that the symbol combination corresponded to the base award of 250 credits, no multiplier (or a multiplier of 1×) is applied to the base award, so the total award shown in the win meter 412 would have been 250 credits. And, if this were the first win of, e.g., a free reel spin feature mode, the total win meter 414 is also 250 credits. Since the player is presented with sequential base awards, beginning with the lowest, 250 credits will be the lowest base award presented to the player during this free spin feature mode reel game simulation.

Figure 8:
Figure 9A:

FIGS. 5-7 are examples of a Class 2 game graphical user interface displaying a wheel feature mode. FIGS. 8-9A/D are exemplary screen shots of a Class 2 game graphical user interface that are employed via an EGM to display a wheel feature mode, with a jackpot feature, dependent on a base game outcome. The wheel feature mode may be in addition to or in lieu of other available feature modes, e.g., the free reel spin mode discussed above.

In FIGS. 5-9, the wheel feature mode has already been triggered, and the bingo game award associated with the bingo game outcome that triggered the wheel feature mode will be presented to the player via one or more wheel spins of the wheel feature mode reel game simulation. A wheel feature mode animation screen effect or message (not shown), e.g., a red screen, may be displayed in the primary display 540 and/or secondary display 542 to indicate to the player that the wheel feature mode is active. The lights or lighting effects around reels 501, 503 and 505 may also be dimmed to further indicate that the player is active in the wheel feature mode.

In some examples, the spinning reel game may enter a feature mode, such as a wheel feature mode or a free spin (and/or free play) feature mode, when one or more feature mode trigger conditions are satisfied. In some examples, a particular bingo game outcome may be a feature mode trigger condition to enter the feature mode. Other outcomes or game occurrences may be a feature mode trigger condition triggering the feature mode. For example, a paytable of the bingo game may have one or more flags associated with one or more bingo game winning patterns, and the feature mode may be triggered when a player's bingo card 504 has a pattern that matches one of the flagged patterns. As another example, the feature mode may be triggered by a winning bingo pattern with an award value and/or a priority higher (or lower) than a certain threshold. In some examples, the free spin feature mode may be triggered when there are more than one (e.g., 2, 3, 4, 5, etc.) bingo game winning patterns.

During the feature mode several "wheel spins" may occur or be simulated, and the bingo game outcome(s) (and/or bingo award(s)) may be presented to the player via the several "wheel spin" outcomes (and/or awards). In some examples, each "wheel spin" game outcome during the feature mode may be a winning outcome, with an associated base game award. The sum of the one or more wheel spin awards may be equal to the bingo game award (and/or sum of bingo awards).

In some examples, each "wheel spin" mode may include increasing wheel credit values, including jackpot values. The increasing wheel values may be highlighted and/or emphasized in animation or other graphics effects in the graphical user interface (e.g., through fireworks, explosions, color schemes, fire wheels, bolding, font size, etc.).

The present disclosure therefore contemplates simulating the feature wheel game such that feature wheel game outcomes are presented sequentially according to their associated base awards, with the lowest base award occurring first and the highest base award presented last, so as to maximize player satisfaction, excitement, enjoyment, and/or engagement. In some examples, feature wheel outcomes with the same base award may be presented sequentially according to the amount of the awards, with feature wheel outcomes with the lowest same base awards being presented first and feature wheel outcomes with the highest same base awards presented last. In other examples, feature wheel outcomes with the same base award may also be presented sequentially according to the number of wheel spins, with the lowest number of wheel spins occurring first and the highest number of wheel spins occurring last.

Turning back to FIG. 5, FIG. 5 is an example 500 of a Class 2 game graphical user interface displaying a wheel feature mode conducted based on a base game outcome. Where possible, reference numerals identifying similar features of the wheel feature game mode example in FIG. 4 are also identified in the wheel feature mode example in FIG. 5.

In addition to the primary display 540 and secondary display 542 and other similar features illustrated in FIG. 4, FIG. 5 includes an illustration of a cash out button 550, a spin button 552 and bet button 554. One or more of the buttons 550, 552, 554 may be discreet physical buttons that are part of the EGM, or virtual buttons on video touch screen on an EGM user interface or on a remote EUD 170a-c. One or more of the buttons 550, 552, 554 may be used as inputs to initiate the reel-simulated bingo game, and spin the feature wheel 558 once active in the wheel feature mode. The feature wheel 558 may be animated to spin or rotate by a user input at the user interface. A number of consecutive wheel spins of the feature wheel 558 may be provided based on the number of base game outcomes or the quality of the winning bingo pattern (e.g., the higher the win, the more the consecutive spins awarded).

In the example of FIG. 5, the wheel feature mode has been triggered by a wheel feature mode trigger condition. In this instance, the feature mode trigger condition is a wheel feature symbol (e.g. "wheel bonus" symbol) 507 appearing in one, reel 505, of the plurality of reels 501, 503, 505. The trigger condition triggers the display of the feature wheel 558. In various examples, one or more bingo patterns that result from matching a bingo ball call from bingo server 107 to bingo card 504 cause the display of the feature mode trigger condition and trigger the wheel feature. For example, with respect to FIG. 5, evaluation of the bingo card against the ball call has resulted in at least one winning pattern presented as a trigger of the wheel spin feature with, following a spin of the feature wheel, the outcome of the wheel spin awarding 25 credits.

In various examples, the one or more bingo patterns that cause the display of the feature mode trigger condition are predetermined from a set of possible bingo patterns.

In the example of FIG. 5, parts of the secondary display 542 may also be used to display and/or animate an optional feature mode display effect (not shown) to indicate with a visual cue (which may be combined with other cues, e.g., sound cues) to the player that a feature mode has been triggered or entered. For example, part or all of the one or more of the displays 540, 542 may be overlaid by a translucent or transparent colored graphic effect (e.g., a red screen), or words, symbols or other letters. The feature mode display effect may be displayed and/or animated to display one or more wheel feature mode wins. In some examples, the feature mode display effect may be animated, emphasized, and/or highlighted (e.g., through fireworks, explosions, color schemes, bolding, font size, etc.). Additionally, along with or separate from the feature display effect, the light of reels 501, 503, 505 may be dimmed to further indicate that the wheel feature mode has begun or may be brightened to indicate that the wheel feature mode has terminated, or vice versa, for example. This graphical communication engages the player, and improves the gaming experience by creating an added environment of perceived or anticipated feature mode winnings.

In this example, the secondary graphical interface 542 displays, and may animate, a feature wheel 558 with a plurality of wheel slices 560. The feature wheel 558 may be of various shapes and may include additional graphical features (e.g., a burning wheel) to enhance the wheel feature mode.

A wheel pointer 556 may be displayed and/or animated along with the feature wheel 558, after the occurrence of the feature mode trigger condition, to identify a selected wheel slice 560. In some examples of the feature wheel 558, a wheel hub display area 568 can be included to enhance the feature mode experience through animation, emphasis and/or highlighting in the wheel hub display area 568 information about the wheel feature mode, primary game information, game graphics, or advertising or the like.

Each wheel slice 560 may be populated with wheel slice values 562. These wheel slice values 562 may be a credit value (e.g., 25 credits), a progressive or jackpot value (e.g., Major, Mini, Jackpot, etc.), a free spin value, and other discrete awards (e.g., a car), for example. The wheel slice values 562 may be incremented with each spin. In some embodiments, each wheel slice value 562 may be increased on each subsequent spin to be equal to or greater than the last credit value outcome.

FIG. 6 illustrates an example 600 of a Class 2 game graphical user interface displaying a wheel feature mode conducted based on a base game outcome. Where possible, reference numerals identifying similar features of the wheel feature game mode example in FIG. 5 are also identified in the wheel feature mode example in FIG. 6.

FIG. 6 includes an illustration of a cash out button 650, a spin button 652 and bet button 654, with similar features of the buttons 550, 552, 554 as illustrated in FIG. 5. FIG. 6 graphically illustrates the wheel in a subsequent spin of the feature wheel 658 where not all of the bingo patterns awards had been won in the prior spin. All or part of the secondary display 642 may also be used to display and/or animate a feature mode display effect (not shown) that the wheel feature mode is still active. Each wheel slice value 662 in FIG. 6 illustrates that one or more of the wheel slice values 662 have been increased so that all the wheel slice values 662 are equal to or greater than the prior win value (e.g., 25 in the case of FIG. 5). In some cases, when one or more winning patterns trigger the wheel feature, one or more win amounts are determined from the bingo patterns that trigger the wheel feature. The one or more win patterns are also arranged based on increasing values of the corresponding win amounts.

In some embodiments, a next slice value to be awarded may be dynamically determined or sequentially selected before a current slice value may be upgraded. Such dynamic determination or sequential selection of the next slice value to be awarded provides a number of technical solutions over a number of technical problems. For example, the memory 208 may only need to store a minimum number of wheels with dynamically generated slice values, rather than multiple predetermined wheels with multiple predetermined award look-up tables. That is, dynamically determining an upgrade may reduce memory access time, which is often a bottleneck issue in gaming. Further, dynamically updating wheels based on win amounts and corresponding awarding order selection also provide more dynamic outcomes and less repetition.

In an exemplary embodiment, five winning bingo pattern awards are available for a total of 440 credits with the feature wheel including available slice values of 5, 10, 20, 30, 50, 60, 75, 95, 100, 120, 150, 180, and 200. An initial wheel may have slice values that correspond to a plurality of predetermined smaller win pattern amounts. In such cases, the initial feature wheel slice values may include 5, 10, 20, 30, 50, and 60. After a first wheel spin has awarded a slice value of 10 credits, all slice values are upgraded to 10, 20, 30, 50, 100, and 120, respectively, with, e.g., the initial slice value of 30 being upgraded to 50. After a slice value of 20 has been awarded, all slice values are upgraded to 20, 50, 95, 100, 150, and 180, respectively, with, e.g., the initial slice value of 20 being upgraded to 95. The dynamic upgrading continues in any subsequent wheel spins. Thus, slice values are upgraded dynamically, which results in less memory accesses, more dynamic outcomes, and less repetitions.

FIG. 7 illustrates an example 700 of a Class 2 game graphical user interface displaying a wheel feature mode conducted based on a base game outcome. Where possible, reference numerals identifying similar features of the wheel feature game mode example in FIGS. 5 and 6 are also identified in the wheel feature mode example in FIG. 7. In the example of FIG. 7, the feature wheel 758 is graphically presented as a series of three rings 760 that includes a series of bars, e.g., 760A, 760B to 760X. A central wheel hub display area 768 is included.

Each of the series of three rings 760 may contain a plurality of bars, e.g., 760A to 760X, that include wheel slice values 762, as described above. The plurality of bars may be of various sizes, colors and include various graphical effects. The central wheel hub display area 768 could include a wheel slice value 762 and could be involved in the wheel feature mode outcome. Those wheel slice values 762 may be a credit value (e.g., 5 credits), a progressive or jackpot value (e.g., Major, Minor, Mini, etc.), free spin values, and other discrete awards (e.g., a car), for example. The wheel slice values 562 may be incremented with each spin.

In some embodiments, the series of three rings 760 may be concentrically rotatable or spinnable, for example, with respect to the central wheel hub display area 768. In one example of FIG. 7, the spin controller 248 of the wheel feature controller 244 is operable to simultaneously, individually, and/or concentrically spin each of the series of three rings 760. Various spin timing and spin sequences of the rings 760 are contemplated. For example, one or more of the bars in the concentric rings may be first displayed before a spin such that each bar is in a starting position relative to the other bars. When the feature wheel 758 is spun, the series of three rings 760 may rotate together; that is, the bars may maintain their relative initial positions or starting positions with respect to other bars. Thus, when the feature wheel 758 stops spinning, each bar is in the same relative position with respect to other bars. In other embodiments, one or more of the three rings 760 may spin independently, e.g., in similar or different rotational directions. Each of the plurality of bars, e.g., 760A to 760X, aligning with the wheel pointer 756 could represent a win, or some other combination of one or more of the plurality of bars, e.g., 760A to X, could represent a win. For example, as seen FIG. 7, the wheel 758 stops based on the winning bingo outcome to align the wheel pointer 756 with a 5 credit, a 20 credit and an "Ultra" (which, in this example, is set as a 2× multiplier when not combined with other "Ultras"). As such, the player would be awarded a win total of 50 credits for the spin. By way of further example, aligning three "Ultra" bars with the "Ultra" in the wheel hub display area could result in awarding the Ultra Mega progressive win (e.g., $10,000.02).

FIGS. 8-9(A-D) are exemplary screen shots of a Class 2 game graphical user interface that are employed via an EGM to display a wheel feature mode with a jackpot feature conducted based on a base game outcome. FIGS. 8 and 9A illustrate an example of Class 2 game interfaces 800 and 900, respectively, displaying a wheel feature mode in a graphical interface along with user inputs. Where possible, reference numerals identifying similar features of the wheel feature game mode example in FIG. 4-7 are also identified in the wheel feature mode example in FIG. 8.

FIG. 8 illustrates a screenshot 800 of a wheel feature mode implemented on an EGM. In the example of FIG. 8, the wheel feature mode includes a jackpot feature. A wheel bonus symbol 807 appearing on one of the plurality of reels 801, 803, 805, here, reel 805, triggered the wheel feature mode. The wheel feature mode graphically presents a jackpot bar 864 comprised of three-tiers (other numbers of tiers are also contemplated) with the feature wheel 858. The feature wheel 858 includes wheel slices 860 and wheel slice values 862. The wheel slice values 862 include the three-tier jackpot bonus awards, e.g., Major, Minor, and Mini. The three-tier jackpot bonus awards may be comprised of, as shown in FIG. 8, static bonus award values that, e.g., may scale with denomination, or they may be comprised of progressive jackpot awards values, or any combination thereof. In some examples, reels 801, 803, and 805 are mechanical reels that include a backlight (not shown). Game controller 202 may control the backlight to display feature effect(s) (e.g., a red screen and dimmed reels).

The feature wheel 858 is graphically displayed or animated in a similar way as FIGS. 5-6, with the added feature of the opportunity of winning a jackpot. FIG. 8 illustrates a feature wheel 858 that is partially displayed to the player to add additional excitement and anticipation associated with participating in the wheel feature mode. Additionally, in contrast to FIGS. 5-6, FIGS. 8-9 illustrate a horizontal presentation of the bingo card 804 and the bingo number listing 806.

In this example, the wheel pointer 856 identifies after the spin a wheel slice 860 that has a credit value outcome of 50. The "Won" meter 812 is updated to reflect a credit value of 50.

Figure 9B:
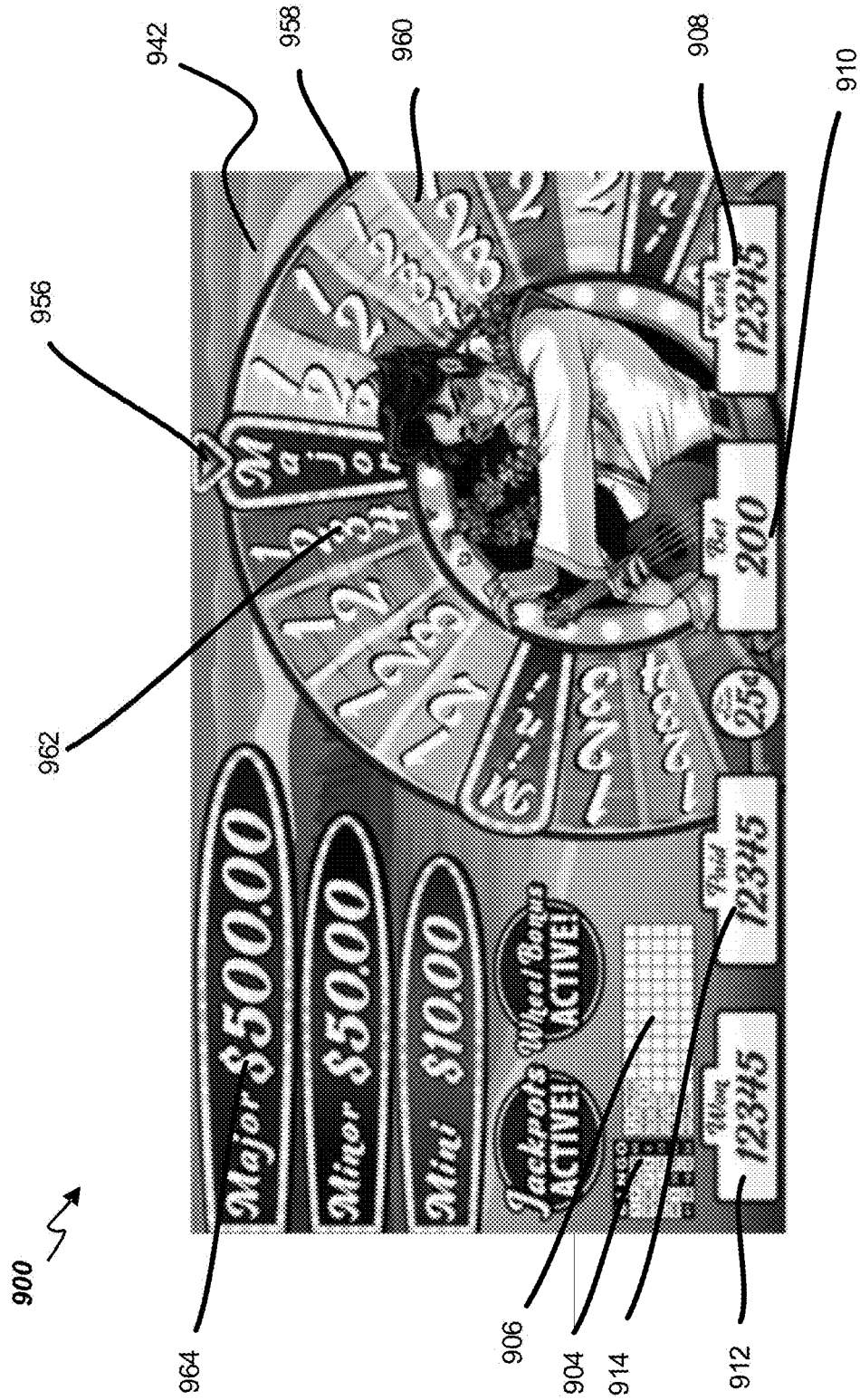
Figure 9C:
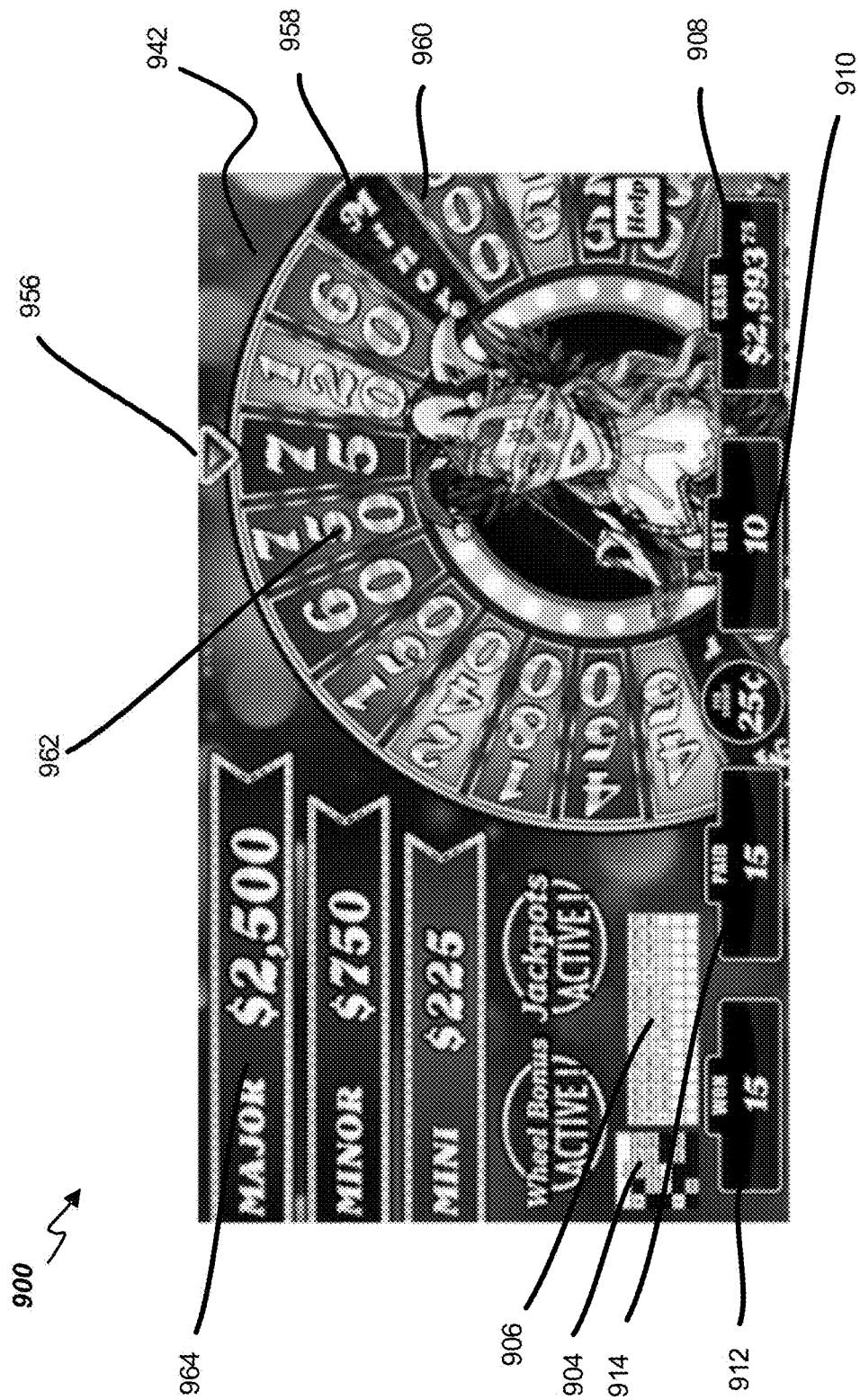
Figure 9D:
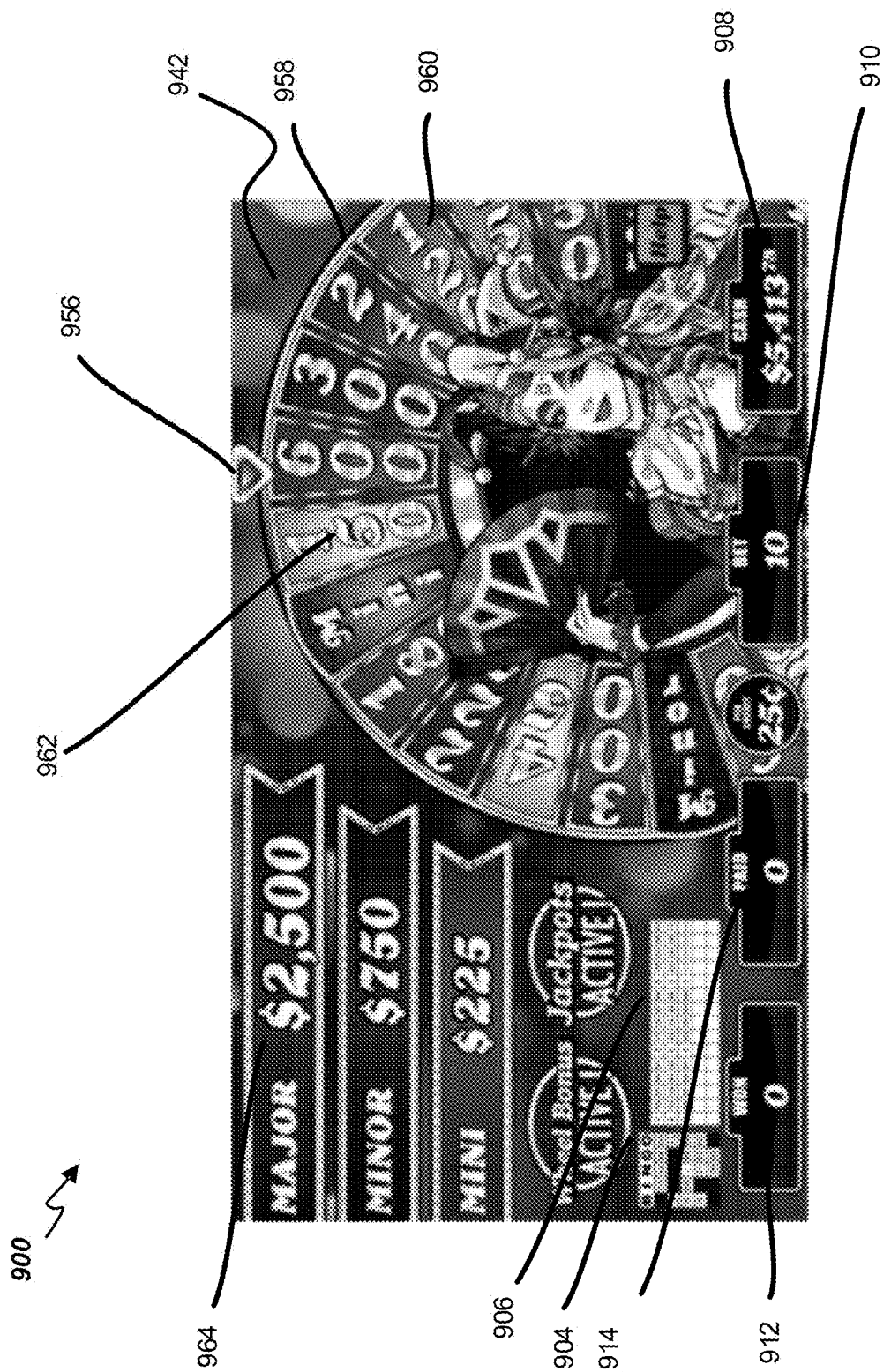

FIG. 9A illustrates a screenshot 900 of a wheel feature mode implemented on an EGM following a wheel spin in FIG. 8. In FIG. 9A, because additional winning bingo pattern outcomes remain after the spin in FIG. 8, the wheel slice credit values 962 are repopulated with wheel slice credit values 962 that are equal to or greater than the wheel slice credit value 862 of 50, the last win. In this spin, the wheel pointer 956 lands on a wheel slice credit value 962 of 75 and the "Won" meter 912 is updated to reflect a total win of 125 credits (50+75) in this wheel feature mode. FIGS. 9B-9D are screenshots illustrating variations of the graphical user interface that show the improved conveyance of increasing wheel values 962 graphically in the limited screen size available with an EGM. Separately, across the screenshots of FIGS. 9A-9D, unique ornamental appearances for the graphical user interface are presented and reflect some of the ornamental approaches for the graphical user interface that are possible.

Additionally, the implementations disclosed improve over presenting the bingo game outcome as a combination of reel symbols. Instead, implementations disclosed herein present a bingo game outcome as a credit value on a wheel slice, where the player is directly informed of the amount of the award as shown on the wheel slice on a main game play area.

This implementation disclosed is in contrast to the existing configurations that require the player to take additional steps in the user interface to manually execute steps to learn and, in some cases, be required to assess, sometimes, confusing award information to determine what the award associated with the combination of reel symbols is. Specifically, such steps may have to be done by the player by going through a series of screens or windows that are remote to the main game window, e.g., displayed on another help screen of the EGM, etc. When the player locates the symbol combination pay table, similar to that shown in FIG. 10, the player may then determine the award associated with the symbol combination before taking the steps needed to return to the main game window.

More specifically, in FIG. 10, the player of existing systems would appreciate that it shows a symbol combination pay table 1000, similar to prior arrangements, that is separate from the main gaming screens 800. In prior arrangements, players would be required to navigate through one, sometimes many, windows to locate this award information. FIG. 10 depicts a symbol combination pay table 1000 that shows the symbols 1007 that are winning combinations 1056. Each winning combination 1056 is in the form of a winning payline 1058 formed by a combination of symbols 1007. Each winning payline 1058 represents, by credit, the payouts 1060, for example. In contrast, the use of the game wheel 758 offers the player direct and immediate information of the amount of the award as shown on the wheel slice in a main game play area, which may be in addition to or without reference to a separate symbol combination pay table 1000.

FIG. 11A is a flow chart illustrating an example feature mode control process 1100 of the system 100. In some examples, some or all of control process 1100 may be implemented via the bingo server 107. In some examples, some or all of control process 1100 may be implemented via an EGM 200. In some examples, some or all of control process 1100 may be implemented in analog and/or discrete circuitry. In some examples, some or all of the control process 1100 may be implemented in machine readable instructions stored in memory (e.g., memory 208) and/or executed by one or more processors (e.g., processor(s) 204).

In some examples, some or all of the control process 1100 may be implemented via program 206.

In the example of FIG. 11A, the control process 1100 begins at block 1102, where a bingo game starts. In some examples, the bingo game may begin when a player makes a wager (e.g., via the user interface) and/or when a player initiates the game through some activation (e.g., pressing a "Spin" or "Play" button on the user interface). At block 1104, a bingo card 304 is received, retrieved, or generated by an EGM 200. In some examples, the bingo server 107 may generate and/or provide the bingo card 304 to the EGM 200, as discussed above. In some examples, the EGM 200 may generate the bingo card 304, as discussed above. In some examples, EGM 200 may retrieve a bingo card from its memory 208 where a number of bingo cards are stored. The retrieved bingo card may be then removed from memory 208. Once the number of bingo cards stored in memory fall below a threshold amount, additional bingo cards are either received from bingo server 107 or generated by EGM 200.

In the example of FIG. 11A, one or more bingo outcomes are determined at block 1106. In some examples, determining the bingo game outcome(s) may comprise a comparison (e.g., via the bingo server 107 and/or EGM 200) of the numbered cells 402 on the bingo card 404 with a bingo number listing 406 (a bingo ball call), which may be generated by the bingo server 107, for example. The comparison may be conducted by the bingo server 107 and/or the EGM 200 to determine which, if any, numbered cells of the bingo card 404 match numbers in the bingo number listing 406. The bingo server 107 and/or EGM 200 may then determine whether one or more patterns formed by the matching numbered cells of the bingo card 304 correspond to one or more patterns in an associated bingo game paytable. If the one or more patterns formed by the matching numbered cells of the bingo card 304 correspond to one or more patterns in the associated bingo game paytable, one or more winning bingo game outcomes are determined or messaged, such that each winning bingo game outcome is associated (e.g., via the paytable) with an award. If the one or more patterns formed by the matching numbered cells of the bingo card 304 do not correspond to one or more patterns in the associated bingo game paytable, a losing bingo game outcome is determined or messaged. In some other examples, the bingo server 107 and/or EGM 200 may only message or determine a winning bingo game outcome.

At block 1108, the bingo server 107 and/or EGM 200 determines whether a feature mode should be triggered. In some examples, the feature mode may be triggered based upon the number of bingo game winning outcomes, whether one or more winning bingo patterns correspond to one or more feature flags in the bingo game paytable, a priority of the one or more winning bingo patterns in the bingo game paytable, and/or other considerations, as discussed above. The feature mode may be triggered by an outcome (e.g., an appearance of a symbol) in a reel of the reel game simulation.

As shown, if the feature mode is not triggered (e.g., there are no or too few winning bingo game outcomes, and/or no or too few feature flags or priority outcomes), that is, the "No" path of block 1108, the control process 1100 proceeds to run the reel simulation 1110, which is further depicted with blocks 1112-1116 as shown in FIG. 11B, and are discussed below.

Referring to FIG. 11B, in block 1112, the size of the multiplier range (and/or size of the multiplier set) is determined or the multiplier set size is only one multiplier value in the typical mode. Additionally, the only value in the set may be determined to be "1×" or unity multiplication. As such, the reel game awards presented in the reel game simulation will not be presented in this example with a multiplier (or always presented with a 1× multiplier) while in typical mode, i.e., in blocks 1112-1116. In block 1114, the bingo outcome(s) (and/or associated award(s)) determined at block 1106 are then presented to the player via a typical reel game simulation in block 1116. In some examples, the bingo server 107 and/or EGM 200 may determine and display at block 1116 a winning combination of symbols in the spinning reel game that awards the award determined in block 1114.

If the feature mode is triggered, that is, the "Yes" path of block 1108, the control process 1100 proceeds to block 1118 where an optional display feature effect(s) (e.g., a red screen and dimmed reels) is displayed and/or animated to indicate on one or more display devices 540, 542 the entry into the feature mode. The control process 1000 proceeds to run the wheel feature mode 1122, which is further depicted with blocks 1124-1136 as shown in FIG. 11C, and discussed below.

When the control process 1100 enters into the wheel feature mode 1122, detailed in FIG. 11C, the control process 1100 displays at block 1124 a feature wheel (e.g., feature wheel 958 of FIG. 9A), with wheel slices (e.g., wheel slice 960 of FIG. 9A) populated with initial wheel slice values (e.g., wheel slice value 962 of FIG. 9A). At block 1126, in response to a player input, instruction, or interaction with the EGM 200 (e.g., to spin the feature wheel), one or both of the feature wheel and the wheel pointer (e.g., wheel pointer 956) are caused to spin or are animated to spin.

When one or both of the feature wheel and the wheel pointer stop spinning, the wheel pointer points to or lands on one of the wheel slices resulting in a wheel outcome. Specifically, at block 1128, the wheel outcome may be determined based on the bingo game award. For example, the wheel slice value 860 may be selected as an outcome equal to the bingo award determined in block 1106 of FIG. 11A. If there is more than one bingo game award, any presentation order of the wheel awards may be determined based on the number of spins awarded. For example, in some embodiments, multiple pattern wins may be shown individually or sequentially. As such, block 1128 may include first determining an award amount for each of the multiple pattern wins, storing respective award amounts in memory (e.g., memory 208 of FIG. 2A), and optionally sorting the respective award amounts. The sorted award amounts or the unsorted award amounts may be used to form matching awards on a wheel, e.g., the wheel 758 of FIG. 7. In some cases, when the slice values of a feature wheel are to be upgraded, slices with smaller values are removed, while the values of all other slices either remain the same or are upgraded. For example, when the feature wheel has one slice of 25, two slices of 50, and three slices of 75, following an award of 50 credits, the one slice of 25 is removed, leaving only the two 50 credits slices and the three 75 credits slices, all of which are equal to or greater than the previously awarded 50 credits. Further to this example, one or more of the remaining slice values may also be upgraded, e.g., one or more of the 50 credit slices may be upgraded to 100 credits and/or one or more of the 75 credit slices may be upgraded to 150 credits, or some other value. In other cases, when a slice is to be upgraded, all slices are upgraded. For example, when the feature wheel has two slices of 50 and three slices of 75, all five slices are upgraded, e.g., to 100 and 150 credits respectively. In yet other cases, when a slice with a specific value is to be upgraded, only slices with the specific value are upgraded. For example, when one slice having a value of 50 (among two slices of 50 and three slices of 75) has been upgraded to have a value of 75, both slices of 50 are upgraded to 75 while the three 75s are kept. In still some other cases, when one or more individual slice with a specific value is to be upgraded, only the individual slice with the specific value is upgraded.

At block 1130, the control process 1100 determines a win value, and a wheel spin that awards, displays, and/or animates the outcome or win value to the player at block 1130. Block 1132 determines whether there remain any winning bingo patterns. If one or more winning bingo patterns remain, that is, in the "Yes" path of block 1132, the control process 1100 at block 1134 repopulates the wheel slices with updated slice values that are greater than or equal to the win value, or the last value. For example, as shown in FIG. 8, the win value is 50 credits. As shown in FIG. 9A, when the wheel slices are updated at block 1134, the wheel slices are repopulated with values greater than or equal to 50 credits. In some examples, however, wheel slices associated a jackpot bonus may be retained based on this condition. The feature mode 1122 returns to block 1126 and continues until no winning bingo pattern outcomes remain as determined in block 1132.

In some examples, the reel outcomes and/or associated reel awards may be predetermined based on available multipliers, bingo game outcome(s), and/or bingo game award(s). In such an example, the determinations in blocks 1112 and 1128 may involve accessing, loading, and/or retrieving the appropriate predetermined reel outcomes and/or associated reel awards, such as from memory 208 and/or one or more of the server computers 102. In some examples, several sets of spinning reel game facades and/or feature wheels may be scripted during development by a game designer. Each set may be comprised of one or more ordered combinations of outcomes that sum to a certain bingo game award.

As shown in FIG. 11C, the feature wheel outcomes, and/or associated feature wheel awards or credit value outcomes are ordered (e.g., from smallest to largest) based on the base award of the reel game simulation, as discussed above. In some examples, the feature wheel outcomes, and/or associated feature wheel awards may be further ordered (e.g., from smallest to largest) based on the number of feature wheel spins. In some examples, the reel game may instead be simulated to present reel game outcomes sequentially according to their overall award or multiplier. While ordering of awards is described with respect to the feature mode, the ordering of awards or other similar ordering of awards may also be used in conjunction with the typical mode reel simulation at block 1110 as well.

It should be appreciated that a free reel spin feature may be run instead of or in addition to the wheel spin in the feature mode. In such a free reel spin feature mode, though approaching the feature mode operation differently, the control process 1100 would determine an available multiplier range as a set of values corresponding to potential multipliers that may be applied to a base award during presentation of the reel game simulation. The size of the multiplier range set is determined to be larger than one, as it is set in the typical mode. This means that the reel game awards presented in the reel game simulation during feature mode may have several potential multipliers that may be applied to a base award during presentation of the reel game simulation. The lack of a multiplier greater than unity in typical mode, and contrasting availability of non-unity multiplier in the free reel spin feature mode, may make the free reel spin feature mode very effective in engaging and/or exciting players.

Referring back to FIG. 11C, if no winning bingo pattern outcomes remains, at block 1136, the control process 1100 returns to block 1120 to determine whether to continue the bingo game.

At blocks 1116, 1130 and 1134, the reel game simulations and wheel feature mode are displayed and/or animated on the graphical interface to the player in feature/typical mode, using the predetermined (and potentially multiplied) base game outcomes and in the potentially predetermined ordering. As shown, the control process 1100 reverts from block 1120 back to the start block 1102 if it is determined that the bingo game has not reached a game-ending bingo pattern. Otherwise, at block 1146, if a game-ending bingo pattern is obtained, the bingo game is ended. This advance in gaming technology provides guaranteed wins with every bonus spin, along with increasing wheel slice values with each spin, that increases player satisfaction, engagement and/or excitement while meeting the regulatory requirements of the base or primary game, e.g., Class 2 bingo.

As indicated above, the control process 1100 may be embodied in program code. The program code may be supplied in a number of ways, for example on a tangible computer readable storage medium, such as a disc or a memory device, e.g., an EEPROM, (for example, that could replace part of memory 208) or as a data signal (for example, by transmitting it from a server). Further, different parts of the program code can be executed by different devices, for example in a client server relationship. Persons skilled in the art will appreciate that program code provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:
   a user interface operable to receive user inputs;
   a display device operable to display a reel-simulated bingo game; and
   a game controller comprising at least one processor and a memory storing a plurality of sequences of instructions, which, when executed, cause the at least one processor to at least:
   generate, in response to an occurrence of a feature mode trigger condition, a feature wheel including a plurality of wheel slices populated with a plurality of wheel slice values, respectively,
   in response to receiving one or more user inputs during the reel-simulated bingo game, rotate the feature wheel a first time for a first of one or more bingo game awards based on one or more bingo outcomes generated from at least one random number generated by a random number generator,
   determine a feature wheel outcome and a first wheel slice value from the feature wheel based on the first of one or more bingo game awards,
   in response to determining that one or more bingo game awards includes a second bingo game award, re-populate the plurality of wheel slice values to have at least the first wheel slice value and rotate the feature wheel a second time.

2. The electronic gaming machine of claim 1, wherein the feature mode trigger condition is satisfied when the one or more bingo game outcomes includes a winning bingo pattern.

3. The electronic gaming machine of claim 1, wherein the electronic gaming machine further comprises at least one credit input operable to receive a credit, and the feature mode trigger condition is satisfied when at least one wheel feature symbol occurs on a reel during the reel-simulated bingo game.

4. The electronic gaming machine of claim 1, wherein one or more of the sequences of instructions, when executed, further cause the at least one processor to, prior to generating the feature wheel:
display a plurality of reels on the display device,
spin, in response to the one or more user inputs, the plurality of reels,
stop spinning the plurality of reels; and
in response to at least one of the plurality of reels displaying a wheel feature symbol, populate the plurality of wheel slices with the plurality of wheel slice values.

5. The electronic gaming machine of claim 1, wherein one or more of the sequences of instructions, when executed, further cause the at least one processor to determine a number of consecutive wheel rotations of the feature wheel based on the one or more bingo game awards.

6. The electronic gaming machine of claim 5, wherein one or more of the sequences of instructions, when executed, further cause the at least one processor to order the number of consecutive wheel rotations based on the one or more bingo game awards.

7. The electronic gaming machine of claim 1, wherein one or more of the sequences of instructions, when executed, further cause the at least one processor to award a sum of the first wheel slice value and the second bingo game award.

8. The electronic gaming machine of claim 1, wherein the plurality of wheel slice values comprise one or more of a credit value, a jackpot, and a free spin.

9. The electronic gaming machine of claim 1, wherein one or more of the sequences of instructions, when executed, further cause the at least one processor to determine a highest wheel slice value of the plurality of wheel slice values based on multiple winning bingo patterns matching a paytable of winning bingo patterns.

10. A method of displaying a feature game on a gaming system, the gaming system comprising a) a plurality of gaming devices, the gaming devices having user interfaces operable to receive a user input and display devices, and b) a game controller comprising at least one processor and a memory storing instructions, which, when executed, cause the at least one processor to initiate a reel-simulated bingo game, the method comprising:
displaying a set of bingo game outcomes in the reel-simulated bingo game on the display devices, the set of bingo game outcomes being associated with a bingo award;
displaying, in response to an occurrence of a wheel feature mode trigger condition in the reel-simulated bingo game on one or more of the gaming devices, a feature wheel including a plurality of wheel slices and a plurality of wheel slice values, respectively, for a first outcome of the set of bingo game outcomes;
animating, in response to receiving the user input from the one or more of the gaming devices while displaying the feature wheel, at least one of a plurality of consecutive wheel rotations of the feature wheel on the display device, the plurality of consecutive wheel rotations of the feature wheel presenting one or more feature wheel outcomes, a sum of the one or more feature wheel outcomes equaling to the bingo award, wherein each feature wheel outcome of the one or more feature wheel outcomes comprises at least one wheel slice value; and
re-populating the plurality of wheel slices with different wheel slice values greater than or equal to a first wheel slice value, corresponding to the first outcome of the set of bingo game outcomes, for a second outcome of the set of bingo game outcomes.

11. The method of claim 10, further comprising, prior to displaying the feature wheel:
displaying a plurality of reels on the display devices,
animating, in response to receiving the user input, of the plurality of reels to spin and stop, and
in response to at least one of the plurality of reels displaying a feature symbol, animating the feature wheel with the plurality of wheel slices populated with the plurality of wheel slice values.

12. The method of claim 10, further comprising, upon displaying the feature wheel, animating a screen effect on at least one of the display devices.

13. The method of claim 12, further comprising animating a red screen as the screen effect.

14. The method of claim 10, further comprising displaying the feature wheel partially on at least one of the display devices.

15. The method of claim 10, wherein each of the plurality of wheel slice values comprises one or more of a credit value, a jackpot value, and a free spin value.

16. A non-transitory computer-readable medium for operating a reel-simulated bingo game on a gaming system including a user interface operable to receive a user input at a gaming device, at least one display device, and a gaming server comprising at least one processor and a memory storing a) a plurality of winning bingo patterns and b) one or more sequences of instructions, which, when executed, cause the at least one processor to perform the steps of:
determining a bingo game outcome in the reel-simulated bingo game, the bingo game outcome being associated with one or more of the winning bingo patterns and a bingo game award;
controlling the display device, in response to an occurrence of a wheel feature mode trigger condition in the reel-simulated bingo game, to display a feature wheel including a plurality of wheel slices populated with a plurality of wheel slice values;
in response to receiving the user input at the gaming device, controlling the display device to animate at least one of a plurality of consecutive wheel rotations of the feature wheel;
determining one or more feature wheel outcomes and a sum of the one or more feature wheel outcomes being equal to the bingo game award, each of the one or more feature wheel outcomes having at least one of the plurality of wheel slice values;
selecting from the plurality of wheel slices a first wheel slice value associated with a first of the winning bingo patterns; and
in response to at least one of the winning bingo patterns remaining, controlling the display device to display the plurality of wheel slices with re-populated wheel slice values greater than or equal to the first wheel slice value.

17. The non-transitory computer-readable medium of claim 16, wherein the one or more sequences of instructions, when executed, cause the at least one processor to perform the step of:
- controlling the display device to display a plurality of reels on the display device,
- in response to receiving the user input at the gaming device, controlling the display device to animate the plurality of reels to spin and to stop, and
- in response to at least one of the plurality of reels displaying a wheel feature symbol, controlling the display device to display the feature wheel including the plurality of wheel slices, the plurality of wheel slices populated with the plurality of wheel slice values.

18. The non-transitory computer-readable medium of claim 16, wherein the first wheel slice value is a static three-tier jackpot value including a Major, Minor or Mini jackpot.

19. The non-transitory computer-readable medium of claim 16, wherein the wheel feature mode trigger condition is satisfied when the bingo game outcome includes at least two of the winning bingo patterns.

20. The non-transitory computer-readable medium of claim 16, wherein the gaming server is networked to an electronic gaming machine comprising a credit input operable to receive a credit, and the wheel feature mode trigger condition is satisfied when a wheel feature symbol is displayed on a reel during the reel-simulated bingo game.

\* \* \* \* \*